United States Patent
Ghessassi

(10) Patent No.: US 10,860,864 B2
(45) Date of Patent: Dec. 8, 2020

(54) SURVEILLANCE AND IMAGE ANALYSIS IN A MONITORED ENVIRONMENT

(71) Applicant: Charter Communications Operating, LLC, St. Louis, MO (US)

(72) Inventor: Karim Ghessassi, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/248,993

(22) Filed: Jan. 16, 2019

(65) Prior Publication Data

US 2020/0226388 A1  Jul. 16, 2020

(51) Int. Cl.
| | |
|---|---|
| G06K 9/00 | (2006.01) |
| G06T 7/40 | (2017.01) |
| G06T 7/20 | (2017.01) |
| H04N 7/18 | (2006.01) |
| H04N 21/4223 | (2011.01) |
| H04N 21/442 | (2011.01) |
| H04N 21/81 | (2011.01) |

(Continued)

(52) U.S. Cl.
CPC ..... *G06K 9/00771* (2013.01); *G06K 9/00302* (2013.01); *G06T 7/20* (2013.01); *G06T 7/40* (2013.01); *G06T 7/521* (2017.01); *G08B 13/1961* (2013.01); *H04N 7/181* (2013.01); *H04N 21/4223* (2013.01); *H04N 21/44218* (2013.01); *H04N 21/4667* (2013.01); *H04N 21/812* (2013.01); *G01M 3/38* (2013.01); *G01N 21/55* (2013.01); *G06K 2009/00322* (2013.01); *G06T 2207/10028* (2013.01); *G06T 2207/30201* (2013.01); *G06T 2207/30232* (2013.01)

(58) Field of Classification Search
CPC ........... G06K 9/00771; G06K 9/00302; G06K 2009/00322; H04N 21/4223; H04N 7/181; H04N 21/4667; H04N 21/812; H04N 21/44218; G06T 7/40; G06T 7/20; G06T 7/521; G06T 2207/10028; G06T 2207/30232; G06T 2207/30201; G08B 13/1961; G01N 21/55; G01M 3/38
See application file for complete search history.

(56) References Cited

U.S. PATENT DOCUMENTS

| | | | |
|---|---|---|---|
| 8,634,701 B2* | 1/2014 | Kang | A61B 5/165 |
| | | | 386/248 |
| 10,171,877 B1* | 1/2019 | Shah | H04N 21/812 |

(Continued)

FOREIGN PATENT DOCUMENTS

| | | | | |
|---|---|---|---|---|
| JP | 2001319221 A | * | 11/2001 | |
| WO | WO-2018106890 A1 | * | 6/2018 | ....... B60R 21/01538 |

*Primary Examiner* — Richard A Hansell, Jr.
(74) *Attorney, Agent, or Firm* — Armis IP Law, LLC

(57) ABSTRACT

According to one configuration, an example surveillance system includes a sensor device, analyzer hardware, and processing hardware. During operation, the sensor device scans a monitored location and generates scan data. In one embodiment, the scan data (such as distance-based data) indicates (defines) surface textures of one or more objects present at the monitored location (such as a location of interest) based on distance measurements. The analyzer hardware analyzes the scan data and change in surface textures. The controller hardware: i) generates a communication based on the detected surface textures, and ii) transmits the communication to a remote station.

31 Claims, 15 Drawing Sheets

(51) Int. Cl.
    *H04N 21/466*     (2011.01)
    *G08B 13/196*     (2006.01)
    *G06T 7/521*     (2017.01)
    *G01N 21/55*     (2014.01)
    *G01M 3/38*     (2006.01)

(56) References Cited

U.S. PATENT DOCUMENTS

| | | | |
|---|---|---|---|
| 10,726,567 B2* | 7/2020 | Lee | G06N 20/00 |
| 2003/0081834 A1* | 5/2003 | Philomin | H04N 21/44218 |
| | | | 382/190 |
| 2007/0052803 A1* | 3/2007 | Chosak | G08B 13/19613 |
| | | | 348/143 |
| 2015/0143404 A1* | 5/2015 | Byers | H04N 21/812 |
| | | | 725/32 |
| 2015/0356349 A1* | 12/2015 | Govindarajeswaran | |
| | | | G06K 9/00308 |
| | | | 382/103 |
| 2017/0005465 A1* | 1/2017 | Wyland | H02H 9/04 |
| 2017/0019710 A1* | 1/2017 | Kim | H04N 21/4147 |
| 2017/0116484 A1* | 4/2017 | Johnson | A61B 5/0002 |
| 2017/0280103 A1* | 9/2017 | Burke | H04N 5/23206 |
| 2018/0178766 A1* | 6/2018 | Oba | B60T 7/14 |
| 2018/0232902 A1* | 8/2018 | Albadawi | G01S 13/726 |
| 2019/0373330 A1* | 12/2019 | Bloch | H04N 21/25891 |

* cited by examiner

SURVEILLANCE AND IMAGE ANALYSIS IN A MONITORED ENVIRONMENT

BACKGROUND

Conventional surveillance systems typically include multiple motion detectors that are distributed throughout a home environment to monitor for intrusions. For example, a home environment can be partitioned to include multiple zones. A corresponding motion detector in each zone (such as a room in a house, portion of a yard, etc.) monitors occurrences of motion in the respective zone being monitored.

The zones of motion detectors in a conventional surveillance system are typically connected to a central controller of the security system that makes decisions about activating a respective alarm. Assuming that a security system is armed, in response to detecting motion in one of the multiple monitored zones, the security system activates the alarm to indicate presence of a moving object. Accordingly, a conventional surveillance system can detect and provide notification of detecting motion, which is presumably an intruder.

Conventional surveillance systems such as those discussed above typically rely on use of a large number of sensors to collect data about a respective environment being monitored. Larger conventional security systems require a substantial amount time and resources to install and setup. Furthermore, conventional systems are inefficient when it comes to leveraging existing hardware that is usually available in most houses (TV screen, DVR, etc.). This is especially true for any cable company offering security on top of traditional offerings.

BRIEF DESCRIPTION OF EMBODIMENTS

There are deficiencies associated with conventional techniques of monitoring a respective home environment using many detectors. For example, conventional camera systems can be configured to record images based on detection of movement, but in reality, they record when the current image changes (by a pre-set threshold amount) with respect to a last recorded image for a monitored region. This means that a respective surveillance camera may be continuously or erroneously triggered as detecting motion through so-called "ghost motion" caused by simple changes in outdoor light. This is very apparent with conventional outdoor cameras, which start recording video and indicate motion when light gets dimmer or brighter even though there may not have been motion at all.

To provide enhanced motion detection, certain embodiments herein include use of one or more LIDAR (Light Detection and Ranging) sensors to detect 'actual' motion or the presence of an object that moved.

In general, LIDAR (sometimes referred to as LiDAR) is a surveying method that measures distance to a target by illuminating the target with pulsed laser light (pings) and measuring the reflected portions of pulses from different portions of the monitored region with a sensor. The distances measured between the sensor and the different regions of a respective object define its contours and its location relative to the sensor device.

In one embodiment, the data from one or more sensors as described herein is used to create 3-D image (such as a textured surface defining 3-D attributes) of a monitored region or location including one or more objects. In addition to defining attributes of the one or more objects at a monitored location, the data generated by the one or more sensor devices as described herein indicates a location, motion, etc., associated with the respective one or more objects.

Note that 3-D imaging as described herein can be achieved using scanning or non-scanning sensor devices. Moreover, embodiments herein are useful over conventional techniques. For example, use of 3-D image scanning reduces false motion events, which reduces unnecessary storage of data, resulting in substantial savings of DVR (Digital Video Recorder) storage space. As a specific example, a standard living room environment with 4 windows and two entry ways would have 100% full coverage with only one sensor device (such as a dome sensor device). Thus, such a dome sensor (steerable in different directions) provides monitoring coverage as a replacement to several conventional sensors otherwise needed to provide the same monitoring capability.

In accordance with further embodiments, the surveillance device as described herein can be configured to include a spectrometer to monitor a frequency of reflected optical energy off an object at a monitored location. Based on analysis of the reflected optical energy, any liquid (such as water) leakage in a monitored region would be detected using the one or more sensor devices, unlike traditional water sensors that are not placed at locations such as living rooms.

In one embodiment, if the one or more sensors (providing 3-D image sensing) as implemented herein detects any movement or motion, the user in a respective subscriber domain is notified that a video feed of the captured event is available in real-time on a mobile communication device (personal device). Availability of the video feed at the user's mobile device alleviates the need for the user to go to a remote display panel (which could be on another floor in a house).

Further embodiments herein include providing a comprehensive home security and automation system that leverages disparate technology modules to provide the maximum value for a respective consumer. Yet further, certain embodiments herein provide maximum coverage and protection while using a minimal number of devices along with existing hardware.

The surveillance system, in one configuration, would allow an entity such as a Cable company to provide a seamless experience that ties: video delivery, DVR functionality, Wi-Fi connectivity and reliable IoT connectivity with a minimal number of devices providing extended coverage.

In accordance with further embodiments, the surveillance system herein includes a sensor device, analyzer hardware, and processing hardware. During operation, the sensor device monitors location and generates scan data. In one embodiment, the scan data indicates surface textures of one or more objects present at the monitored location (such as a location of interest). The analyzer hardware analyzes the scan data and information such as change in detected surface textures. In one embodiment, the change in surface textures indicates motion or state of an object. The controller hardware: i) generates a communication based on the detected surface textures, and ii) transmits the communication to a remote station (communication device, management resource, etc.).

In one embodiment, the analyzer analyzes the scan to detect a security event such as movement of an object in the monitored location. The remote station is a mobile communication device operated by a user. Including the security event in the communication notifies the user at the remote station of the detected movement of the object.

In accordance with further embodiments, the sensor device includes spectrometer hardware operative to detect presence of liquid on one or more monitored surface textures of the object at the monitored location. In response to detecting an event such as the presence of the liquid as indicated by respective scan data, a processing resource (such as controller hardware) generates a warning communication that indicates the presence of the liquid (in a location where the liquid should not be) to the user operating the remote station.

In accordance with still further embodiments, to determine a trigger event such as motion in the monitored location, the analyzer retrieves a first set of scan data generated by the sensor device; the first set of scan data representing baseline conditions of surface regions in the monitored location; the analyzer compares a second set of scan data produced by the sensor device (during a scan mode) to the first set of scan data (baseline information) to detect the motion (such as movement of the object, presence of a new object, etc.). The difference between the second set of scan data and the baseline scan data indicates whether there are changes in surface textures (or movement of an object) in a location of interest.

In one embodiment, the surface textures as detected by the sensor device define a 3-D shape of one or more objects in the monitored location. This can be achieved in any suitable manner. For example, in one embodiment, the sensor device transmits optical energy (such as one or more pings) in multiple directions at the monitored location. The sensor device measures distances to the surface textures of the one or more objects based on the different portions of the optical energy (one or more pings) that reflects off the one or more objects back to the sensor device during the different ping tests.

Note that the one or more objects at the monitored location can be any suitable matter. For example, in one embodiment, one of the objects being monitored at the location of interest is a human face. The scan data produced by the sensor device captures an image (such as 3-D or 2-D image of the human face). In such an instance, the analyzer analyzes the scan data produced by the sensor device to determine attributes such as an identity of the human face, an emotional state/expression of the human face, etc. Processing hardware in the surveillance system generates the communication to indicate the detected expression of the viewer.

In accordance with yet further embodiments, the surveillance system further includes a display screen that displays images at the monitored location. The object monitored by the sensor device is a face of a first viewer viewing the images on the display screen. The scan data produced by the sensor device is an image of the face of the first viewer. Thus, via the scan produced by the sensor device, the analyzer receives images of the first viewer viewing the images. The analyzer identifies an expression (such as emotional or physical response) of the first viewer viewing the displayed images (on the display screen) based on the images of the first viewer as captured by the scan data generated by the sensor device.

In accordance with further embodiments, the processing hardware (or other suitable resource) in the surveillance system produces feedback including the identified response of the first viewer to the displayed images. By further way of non-limiting example embodiment, a detected facial or gestural expression of the first viewer indicates an emotional and/or physical state of the first viewer as caused by the displayed images.

Subsequent to detecting a facial expression indicated by the scan data generated by the sensor device, the processing hardware of the surveillance system maps the detected facial or gestural expression of the viewer to a mood value representative of the detected expression. The processing resource produces the communication to include the mood value.

In one embodiment, the images on the display screen viewed by the first viewer includes images/sound associated with a product advertised to the first viewer. The processing hardware produces the communication (such as feedback) to indicate an identity of the product being advertised and the mood value representative of the detected expression of the first viewer.

Accordingly, embodiments herein include determining an emotional response of a viewer with respect to a displayed advertisement (played back via audio and/or video from a playback device) and generating feedback indicating the emotional response. In one embodiment, the processing hardware communicates the feedback to a sponsor promoting the product via the images (such as an advertisement) on the display screen. In a manner as previously discussed, multiple subscriber domains can be monitored to provide a respective advertisement sponsor feedback indicating response from multiple different viewers.

In accordance with yet further embodiments, the processing hardware in the surveillance system as described herein controls playback of subsequent images/audio on a playback device (such as a display screen, audio speaker, etc.) at the monitored location depending on the detected surface textures (3-D images captured by the sensor device.

In one embodiment, the subsequent images selected for playback to the first viewer is pre-recorded video and/or audio other than images of the monitored object at the location of interest. For example, if the first viewer has a positive emotional response to particular images, the processing hardware identifies additional images (or related products) that are likely to be of interest to the viewer.

Accordingly, embodiments herein include: displaying images on a display screen to a first viewer; receiving scan data such as images of the first viewer viewing the images; identifying a response of the first viewer viewing the displayed images based on the images of the first viewer; and producing feedback including the identified response of the first viewer to the displayed images.

Note further that the scan data produced by the sensor device can include images of multiple viewers viewing the images displayed on a display screen. In such an instance, the analyzer resource receives images of a first viewer and a second viewer viewing the images on the display screen. Via analyzing the scan data, the analyzer resource identifies a response of the multiple viewers (such as first viewer and second viewer communicating with each other) viewing the displayed images based on the images of the first viewer. The processing hardware then produces one or more communications such as feedback to include the identified response of the first viewer and the second viewer to the images displayed on the display screen.

In one embodiment, via monitoring of the generated scan data, the analyzer resource identifies a response of the first viewer and/or second viewer based on analysis of one or more communications between the first viewer and a second viewer viewing the images displayed on the display screen. The analyzed communications between the one or more viewers can include any responses such as the viewers smiling and turning towards each other during a portion of a viewed advertisement, one or more viewers physically turning their head and/or walking moving away from the display screen during an advertisement, etc.

Note that in addition to or as an alternative to detecting an emotional response of the one or more viewers viewing images, embodiments herein can include detecting physical attributes (such as gender, age, etc.) of the first viewer based on the images of the first viewer based on analysis of the scan data produced by the sensor device. In such an instance, the processing hardware produces the feedback regarding the displayed images to indicate the physical attributes (such as gender, age, etc.) of the one or more viewers being monitored at the location of interest.

Embodiments herein are useful over conventional techniques. For example, implementing a 3-D image sensing system (via one or more image sensors) enables detailed processing of events that occur in a monitored location of interest. The detected events can be communicated to a respective remote station for any suitable reason. For example, detection of motion in the monitoring location of interest may be an intruder. Embodiments herein include providing notification of the intrusion event to a user via display of a communication on a display screen (such as on a television device, mobile communication device, etc.). In accordance with alternative embodiments, the facial response of a respective viewer as captured by the sensor device at the monitored location of interest (playing back images and/or sound) provides useful feedback regarding a viewer's response to playback of content such as images, audio, etc. (such as an advertisement).

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to provide surveillance according to embodiments herein. The instructions, when executed by the computer processor hardware, cause the computer processor hardware (such as one or more co-located or disparately processor devices or hardware) to: scan a monitored location; generate scan data, the scan data indicating surface textures of an object present at the monitored location; analyze the scan data; generate a communication based on the detected surface textures; and transmit the communication to a remote station.

Another embodiments herein includes a computer readable storage medium and/or system having instructions stored thereon to provide surveillance according to embodiments herein. The instructions, when executed by the computer processor hardware, cause the computer processor hardware (such as one or more co-located or disparately processor devices or hardware) to: display images on a display screen to a first viewer; receive images of the first viewer viewing the images; identify a response of the first viewer viewing the displayed images based on the images of the first viewer; and produce feedback including the identified response of the first viewer to the displayed images.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing surveillance in at a monitored location. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
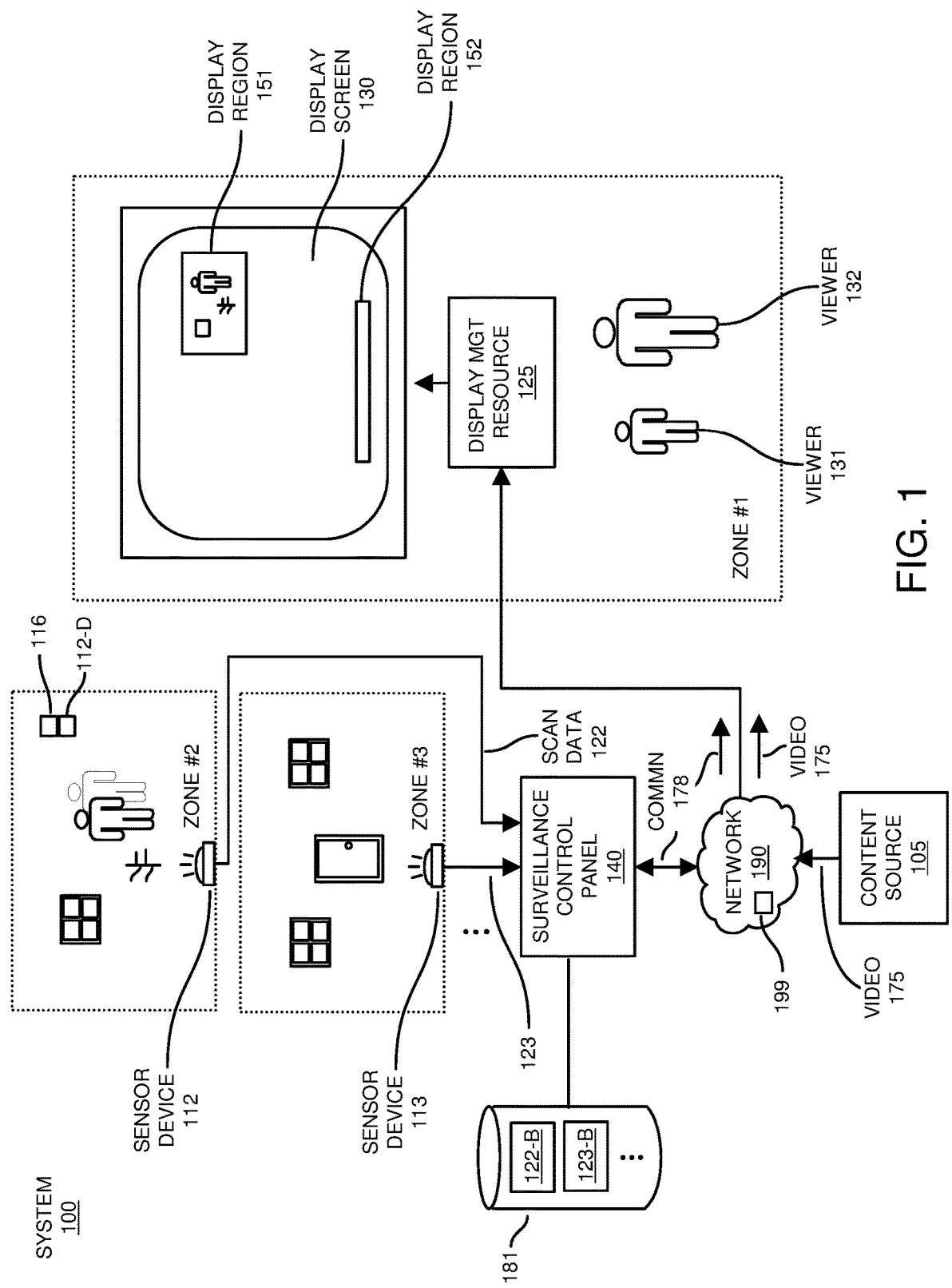
FIG. 1 is an example diagram illustrating a surveillance system according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments herein, a surveillance system includes a sensor device, analyzer hardware, and processing hardware. During operation, the sensor device scans a monitored location of interest and generates scan data using distance measurements. In one embodiment, the scan data indicates surface textures of one or more objects present at the monitored location of interest. The analyzer hardware analyzes the scan data and change in surface textures over time. The controller hardware: i) generates a communication based on the detected surface textures, and ii) transmits the communication to a remote station.

Now, more specifically, FIG. 1 is an example diagram illustrating a surveillance system according to embodiments herein.

As shown, the surveillance system 100 includes multiple zones including zone #1, zone #2, zone #3, etc. Surveillance system 100 further includes surveillance control panel 140, network 190, content source 105, and display management resource 125 (such as a set top box, digital video recorder, etc.).

In this example embodiment, the sensor device 112 monitors zone #2 in a subscriber domain; the sensor device 113 monitors zone #3 in a subscriber domain; and so on.

Note that any of the resources as described herein includes hardware or software resources (or a combination of both) in which to carry out respective operations.

For example, surveillance control panel 140 can be configured to include surveillance control hardware and/or surveillance control software, display management resource 125 can be configured to include display management hardware and/or display management software; sensor device 112 can be configured to include sensor hardware and/or sensor software; sensor device 113 can be configured to include sensor hardware and/or sensor software; and so on.

Further in this example embodiment, each zone includes one or more stationary or mobile objects. For example, as shown in FIG. 1, zone #2 includes a window and a person (such as an intruder in motion); zone #3 includes multiple windows and a door.

Further embodiments herein include providing notification of respective motion in a monitored zone to a respective subscriber present in a subscriber domain (such as combination of zone #1, zone #2, zone #3, etc.

Figure 12:
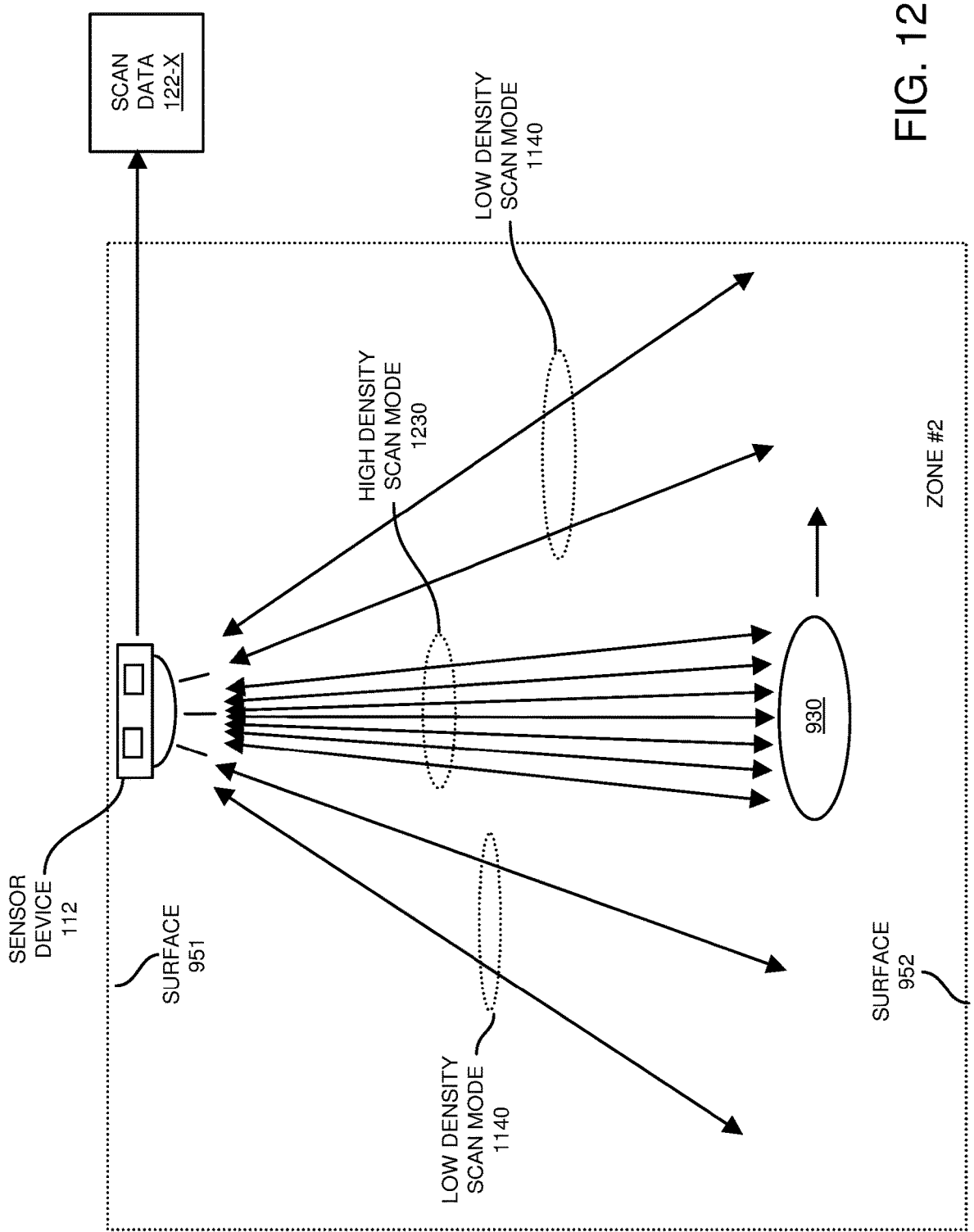
FIG. 12 is an example diagram illustrating low density distance-based sampling of a zone according to embodiments herein.

Note further that the one or more sensor devices as described herein can be mobile as opposed to stationary. For example, as shown in FIG. 12, in an indoor (inside a building) application, the one or more sensor devices 112-D as described herein (such as distance-based monitoring, standard two-dimensional image monitoring, etc.) can be configured to reside in or be attached to a drone 116 (flying, roaming vehicle) that would be wirelessly connected to the surveillance control panel 140. In one embodiment, the drone could be loaded with a 3D layout of a monitored building. The drone can then 'patrol' each floor/room and check for any anomalies as listed in the current application. Such an embodiment useful because a drone including the corresponding surveillance devices is not restricted to monitoring one zone, but can instead offer a much wider range of surveillance monitoring the different types of technologies (distance-based LIDAR monitoring and standard two-dimensional photo sensor monitoring).

Further embodiments herein operating drone as previously discussed and corresponding one or more sensor devices in an outdoor application outside a building. In such an instance, a drone and corresponding sensors initially can reside at a homing pad such as attached to a pole, building side, roof, etc. The sensor devices on the drone would passively scan the area. If sensor devices on the drone detect any movement from one or more objects in the monitored area, the drone would detach (lift off and fly) from the docking station (which offers electrical charging), then hover closer to the area found to be of interest where an object is detected or simply just scan areas for further moving objects. If desired, the drone can be configured to turn ON additional sensors (2-dimensional camera, infrared sensor camera, etc.), plus any optical lighting desired. In such an instance, the drone includes a corresponding wireless communication link back to the surveillance control panel 140.

In one embodiment, the wireless communication link (such as a data feed of surveillance information) would be sent to a respective server for storage of respective surveillance data so that such data cannot be destroyed if the drone is destroyed.

Such a system as described herein also can be used in real-time on a display station for any personal assigned to monitoring. The drone can then issue a challenge and identify the person through facial recognition or state a verbal passcode, etc.

In a similar manner as previously discussed, the sensor device on the drone can detect an anomaly such as fire, water, etc. In such an instance, the system would trigger any pre-set notifications, alarms, etc. The drone (or multiple of them) can provide aerial surveillance of a large area and leverage all the functionality provided by the IoT Dome.

In one embodiment, each of the sensor devices 112 and 113 detect motion in respective zones based on 3-D imaging. This is more specifically shown and discussed in FIG. 2.

Figure 2:
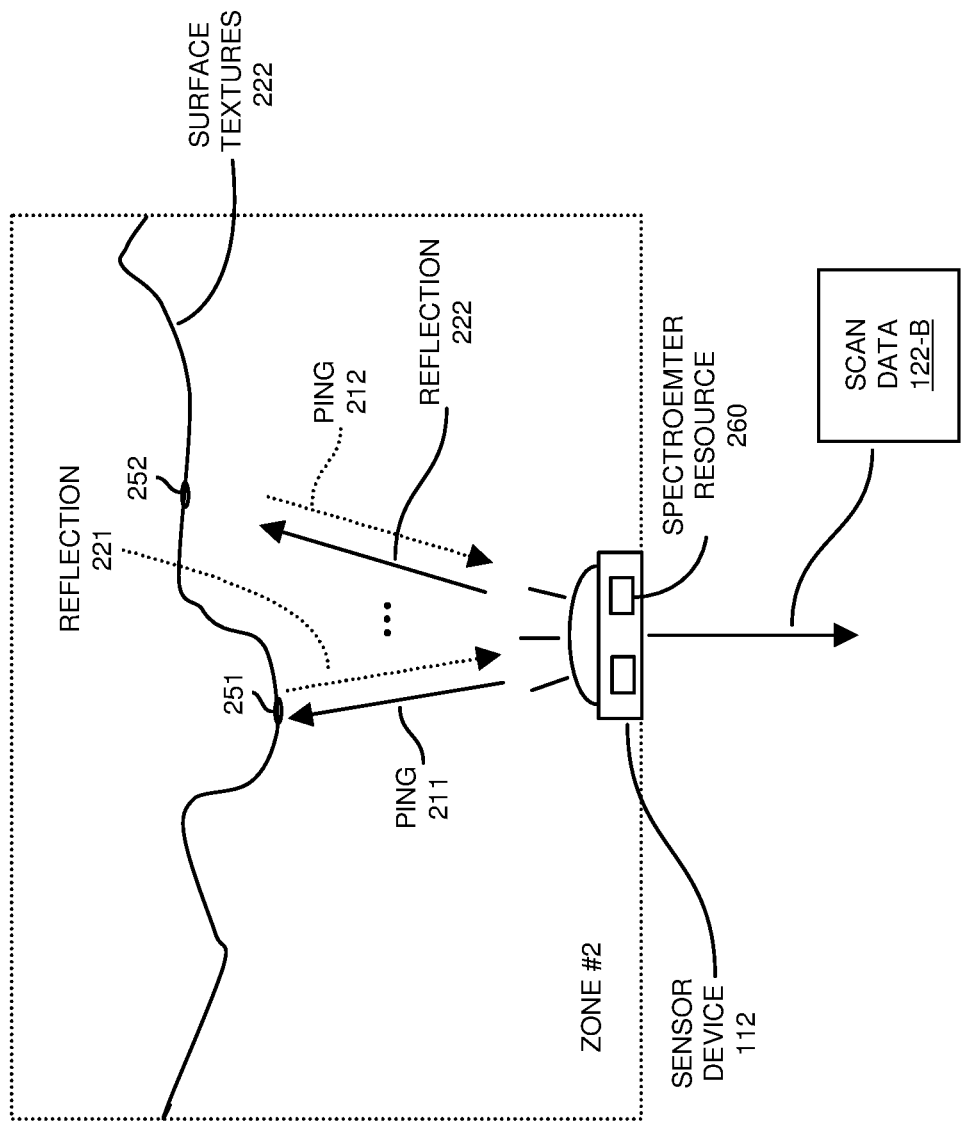
FIG. 2 is an example diagram illustrating monitoring of a respective location during a first timeframe using a sensor device according to embodiments herein.

As shown in the example embodiment of FIG. 2, the sensor device 112 monitoring zone #2 transmits a first ping 211 (such as first quantum of optical energy or pulses of laser energy) in a first angular direction to a region of interest 251 in zone #2. A portion of the energy associated with the first ping 211 is reflected off a respective object (at region of interest 251) in the zone #2 back to the sensor device 112.

The sensor device 112 measures a time it takes for the ping 211 to travel the round trip from the sensor device 112 to the object (such as region of interest 251) and back to the sensor device 112. Based on knowing the speed of light energy, the sensor device 112 uses the round-trip time associated with ping 211 to determine the distance from the sensor device to the object at the first angular direction.

Via scanning, the sensor device 112 repeats this process for each of multiple different angular directions to create a 3-D contour of the surface textures 222 in the zone #2.

For example, the sensor device 112 monitoring zone #2 transmits a second ping 212 (such as a second quantum of optical energy or pulses of laser energy) in a second angular direction to a second region of interest 252 in zone #2. A portion of the energy associated with the second ping 212 is reflected off a respective object (at region of interest 252) in the zone #2 back to the sensor device 112.

The sensor device 112 measures a time it takes for the second ping 212 to travel the round trip from the sensor device 112 to the object (such as region of interest 252) and back to the sensor device 112. The sensor device 112 uses the round-trip time associated with ping 212 to determine the distance from the sensor device 112 to the object at the second angular direction.

In one embodiment, each of the sensor devices (such as sensor device 112) as described herein generates distance-based scan data indicating distances between the respective sensor device and different regions of a monitored region. Variations in distance define a contour or surface texture of the object of interest.

In this manner, the sensor device 112 uses the round-trip time information at different angles to create a 3-D image (scan data 122-B) of surface textures 222.

In one embodiment, the scan data 122-B provides a baseline image of stationary objects in the location of interest (zone #2).

As further discussed herein, note that sensor device 112 optionally includes a spectrometer resource 260. During operation, the spectrometer resource 260 monitors and detects presence of liquid such as water on surface textures 222 at monitored location of interest (zone).

As further discussed herein, the sensor device 112 can be configured to include a co-located (supplemental) image sensor operable to detect standard 2-dimensional images (such as based on color, intensity, etc.) in the monitored region. This provides a unique level of redundant monitoring in the monitored region of interest.

For example, in one embodiment, in a manner as described herein, while the supplemental image sensor is OFF (such as to conserve power), the sensor device 112 monitors a respective region of interest for possible moving objects or shapes of objects of interest using distance-based detection (ping and reflection). In response to a trigger condition of identifying an object of interest, the supplemental image sensor (2-D image sensor that detects different colors of light) monitors the same region, creating 2-dimensional images (such as video) of the region of interest. The supplemental images are stored along with the 3-dimensional distance-based scan data. Thus, the surveillance system has available surface texture information (defining a 3-dimension image) and 2-dimensional image information (such as standard image information derived from multiple photo sensors) for viewing by respective personnel such as police, homeowner, etc.

Figure 3:
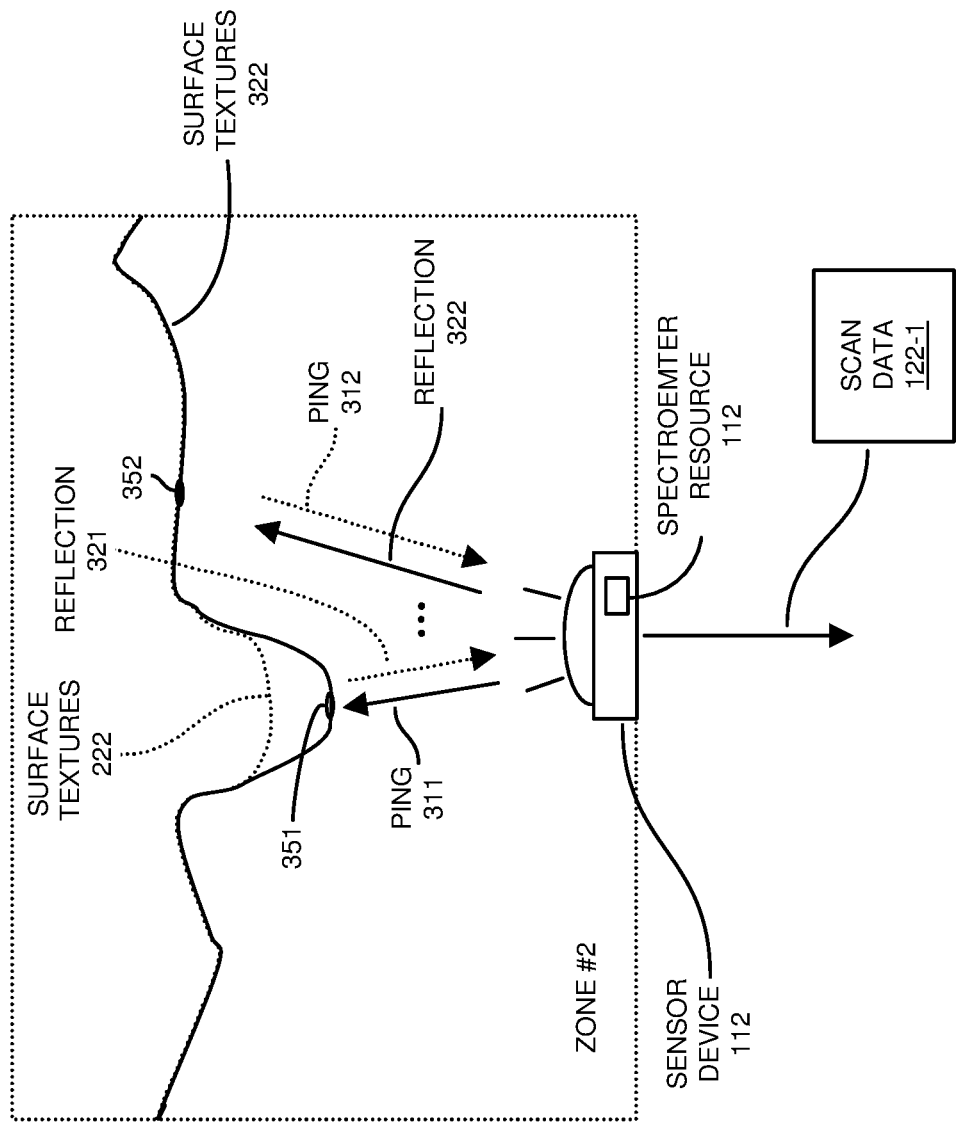
FIG. 3 is an example diagram illustrating monitoring of a respective location during a second timeframe using a sensor device according to embodiments herein.

FIG. 3 is an example diagram illustrating monitoring of a respective location using a sensor device according to embodiments herein.

Subsequent to producing the baseline image (scan data 122-B) indicating stationary objects in the monitored zone #2, the sensor device 112 repeats a process of producing a 3-D image of one or more objects at the point of interest (zone #2).

For example, during a subsequent scan of the location of interest (zone #2), the sensor device 112 monitoring zone #2 transmits a first ping 311 (such as first quantum of optical energy or pulses of laser energy) in a first angular direction to a region of interest 351 in zone #2. A portion of the energy associated with the first ping 311 is reflected off a respective object (at region of interest 351) in the zone #2 back to the sensor device 112.

The sensor device 112 measures a time it takes for the ping 311 to travel the round trip from the sensor device 112 to the object (such as region of interest 351) and back to the sensor device 112. The sensor device 112 uses the round-trip time associated with ping 311 to determine the distance from the sensor device 112 to the region of interest 351 of the object at the first angular direction.

Via scanning, the sensor device 112 repeats this process for each of multiple different angular directions to create a 3-D contour of the surface textures 222 in the zone #2.

For example, the sensor device 112 monitoring zone #2 transmits a second ping 312 (such as a second quantum of optical energy or pulses of laser energy) in a second angular direction to a second region of interest 352 in zone #2. A portion of the energy associated with the second ping 312 is reflected off a respective object (at region of interest 352) in the zone #2 back to the sensor device 112.

The sensor device 112 measures a time it takes energy from the second ping 312 to travel the round trip from the sensor device 112 to the object (such as region of interest 352) and back to the sensor device 112. The sensor device 112 uses the round-trip time associated with ping 312 to determine the distance from the sensor device 112 to the object at the second angular direction.

In one embodiment, the sensor device 112 is implemented as a LIDAR (Light Detection and Ranging) sensor to detect 'actual' motion or the presence of one or more objects at a location of interest. In general, LIDAR (sometimes referred to as LiDAR) is a surveying method that measures distance to a target by illuminating the target with pulsed laser light (pings) and measuring the reflected portions of pulses from different portions of the monitored region with a sensor. The distances measured between the sensor and the different regions of a respective object define dimensions/contours of the respective object and its location relative to the sensor device.

Note that the 3-D imaging as described herein can be achieved using scanning or non-scanning sensor devices. Use of 3-D image scanning reduces false motion events, which reduces unnecessary storage of data, resulting in substantial savings of DVR (Digital Video Recorder) storage space.

As a specific example, a standard living room environment with 4 windows and two entryways would have 100% full coverage with only one sensor device (such as a dome sensor device). Thus, such a dome sensor provides monitoring coverage as a replacement to several conventional sensors otherwise needed to provide the same monitoring capability.

As further discussed herein, as previously discussed, the sensor device 112 can be configured to include a co-located image sensor operable to detect standard 2-dimensional images (such as based on color, intensity, etc.) in the monitored region. This provides a unique level of redundant monitoring in the monitored region of interest.

For example, in one embodiment, in a manner as described herein, while the supplemental image sensor is OFF (such as to conserve power), the sensor device 112 monitors a respective region of interest for possible moving objects or shapes of objects of interest. In response to a trigger condition of identifying an object of interest, the supplemental image sensor monitors the same region, creating 2-dimensional images (such as video) of the region of interest. The supplemental images are stored along with the 3-dimensional distance-based scan data. Thus, the surveillance system has available surface texture information (defining a 3-dimension image) and 2-dimensional image information for viewing by respective personnel such as police, homeowner, etc.

Referring again to FIG. 1, in accordance with further embodiments, a surveillance system includes a sensor device, analyzer hardware, and processing hardware.

During operation, in a manner as previously discussed, the sensor device 112 scans a monitored location (zone #2) and generates scan data 122. The sensor device 112 scans a monitored location (zone #3) and generates scan data 123.

In one embodiment, the scan data 122 indicates surface textures of one or more objects present at the monitored location of interest. An analyzer resource (hardware and/or software) in the surveillance control panel 140 (or other suitable resource) analyzes the scan data 122 and detects any change(s) in surface textures associated with the zones being monitored.

In one embodiment, a controller resource (such as controller hardware and/or controller software) in the surveillance control panel: i) generates a communication based on the detected surface textures, and ii) transmits the communication to a remote station.

In one embodiment, the analyzer of the surveillance control panel 140 analyzes the scan data 122 and 123 to detect a security event such as movement of an object in the one or more monitored locations. This is shown in FIG. 3 in which the scan data 122-1 indicates that surface textures 322 are different than surface textures 222 (scan data 222).

In one embodiment, the remote station is a mobile communication device operated by a user. Inclusion of a notification indicating a security event in the communication to a user of the mobile device notifies the user of the detected movement of the object.

Alternatively, as shown in this example embodiment, the surveillance control panel 140 receives and compares the scan data 122-1 to the scan data 122-B. As previously discussed, the comparison indicates a change in the surface textures 322 with respect to surface textures 222.

In accordance with further embodiments, note that the sensor device 112 can be configured to include a spectrometer resource (implemented as hardware and/or software) that detects presence of any liquids on the surface textures of the object at the monitored location.

In response to detecting an event such as the presence of the liquid, change in surface textures indicating movement, the surveillance control panel 140 generates a communication 178 to indicate the presence of the foreign material (such as liquid) to the user (such as viewer 131, viewer, 132, etc.) and/or motion detected in zone #2.

In accordance with still further embodiments, to determine a trigger event such as motion in the monitored location, the analyzer retrieves a first set of scan data generated by the sensor device; the first set of scan data representing baseline conditions of surface regions in the monitored location; the analyzer compares a second set of scan data produced by the sensor device (during a scan mode) to the first set of scan data (baseline information) to detect the motion (such as movement of an object, presence of a new object, etc.).

In one embodiment, if the one or more sensors 112, 113, etc., (providing 3-D image sensing) as implemented herein detects any movement or motion, the user (such as viewer 131, viewer 132, etc.) in a respective subscriber domain (such as in zone #1) is notified that a video feed of the captured event is available in real-time on a mobile communication device (personal device). For example, in response to detecting a trigger event such as an intrusion, the surveillance control panel 140 generates a respective communication 178 indicating the motion event and/or liquid detection in zone #2.

In one embodiment, the surveillance control panel 140 transmits the communication 178 over a shared communication link (such as a cable network link) through the network 190 to a central monitoring system 199. Thus, the central monitoring system 199 is notified of an intrusion event in zone #2. The central monitoring system 199 transmits the communication 178 to display management resource 125 (such as a set top box or DVR). In response to receiving the communication 178 indicating the intrusion in zone #2, the display management resource 125 initiates display of a notification in display region 151 and/or display region 152.

In one embodiment, the display region 152 is a ticker at the bottom of the display screen 130 indicating occurrence of the detected intrusion event or water leak in zone #2. In one embodiment, the user can further select viewing of a video stream indicating the intrusion event in display region 151 (such as a picture in picture). In one embodiment, in response to a user in zone #1 requesting playback of the video captured by the sensor device in zone #2, the display management resource 125 retrieves the video stream and displays it on display screen 130 such as in the display region 151. Additionally, or alternatively, the images captured by the sensor device 112 in zone #2 can be routed and displayed to a mobile communication device operated by the user associated with a respective subscriber domain.

Availability of the video feed at the user's mobile device and/or display screen 130 (such as where the user is currently located) alleviates the need for the user to go to a remote display panel (which could be on another floor in a house).

The surveillance system 100, in accordance with one configuration, allows an entity such as a cable company to provide a seamless experience that ties: video delivery, DVR functionality, Wi-Fi connectivity and reliable IoT connectivity with a minimal number of devices, while providing extended coverage.

As further discussed herein, the sensor device 112 can be configured to include a co-located image sensor operable to detect standard 2-dimensional images (such as based on color, intensity, etc.) in the monitor region. This provides a unique level of redundant monitoring in the monitored region of interest.

Figure 4:
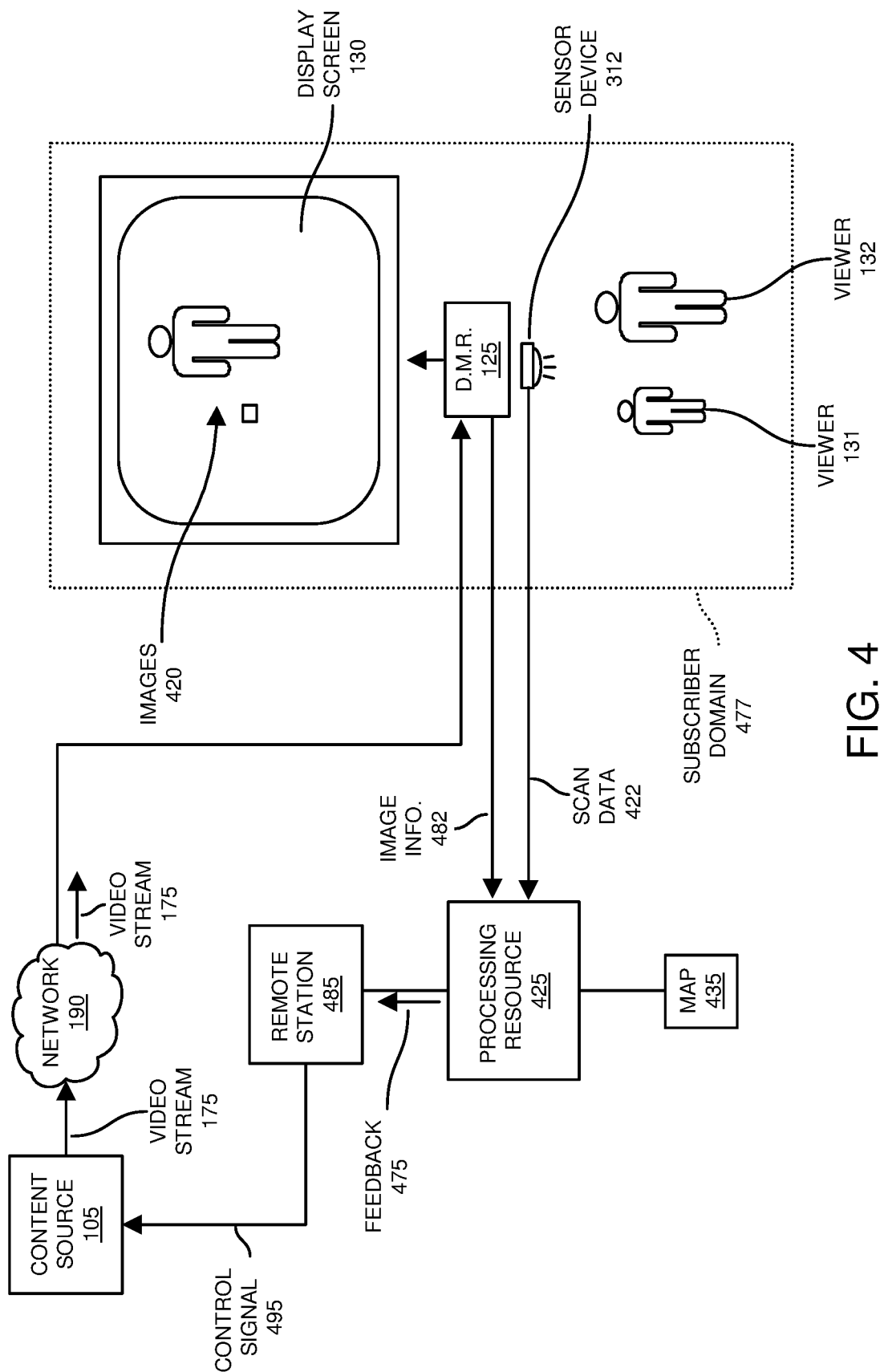
FIG. 4 is an example diagram illustrating a sensor device that monitors one or more viewers according to embodiments herein.

FIG. 4 is an example diagram illustrating a sensor device that monitors one or more viewers according to embodiments herein.

In this example embodiment, there are one or more viewers (such as viewer 131, viewer 132, etc.) present in the subscriber domain 477. The display management resource 125 receives selection of a title of content from a viewer. In response to receiving the selection, the display management resource 125 receives the selected title of content as a video stream 175 over a shared communication link for playback of corresponding images 420 (associated with the selected title of content) on the display screen 130 (playback device). The sensor device 312 monitors viewers viewing the display screen 130.

In one embodiment, as further discussed below, the sensor device 312 monitors the subscriber domain 477 and captures expressions (such as facial expressions, gestural expressions, etc.) of the viewers viewing the images on display screen 130.

The facial expression (response) of a respective viewer as captured by the sensor device 312 at the monitored location of interest (subscriber domain 477) provides useful feedback regarding a viewer's level of interest associated with playback of images (such as an advertisement) on the display screen 130.

In one embodiment, the display management resource 125 communicates image information 472 (such as attributes of current video stream 175 played on display screen 130 and/or images 420) to the processing resource 425. Accordingly, the processing resource 425 (in the subscriber domain 477 or disposed at a remote location) is aware what content is viewed by the viewers on display screen 130.

Sensor device 312 communicates scan data 422 to processing resource 425. In one embodiment, the scan data 422 communicated from the display management resource 125 to the processing resource 425 includes images of viewers in subscriber domain 477 viewing the playback of video stream 175 on the display screen 130.

Processing resource 425 produces feedback 475 indicating a level of interest viewers have for the images 420 associated with the video stream 175 displayed on display screen 130. Processing resource 425 communicates the feedback 475 to a remote station 485.

Collection of surveillance information (such as images of viewers) in subscriber domain 477 and its different possible uses are further discussed below.

Figure 5:
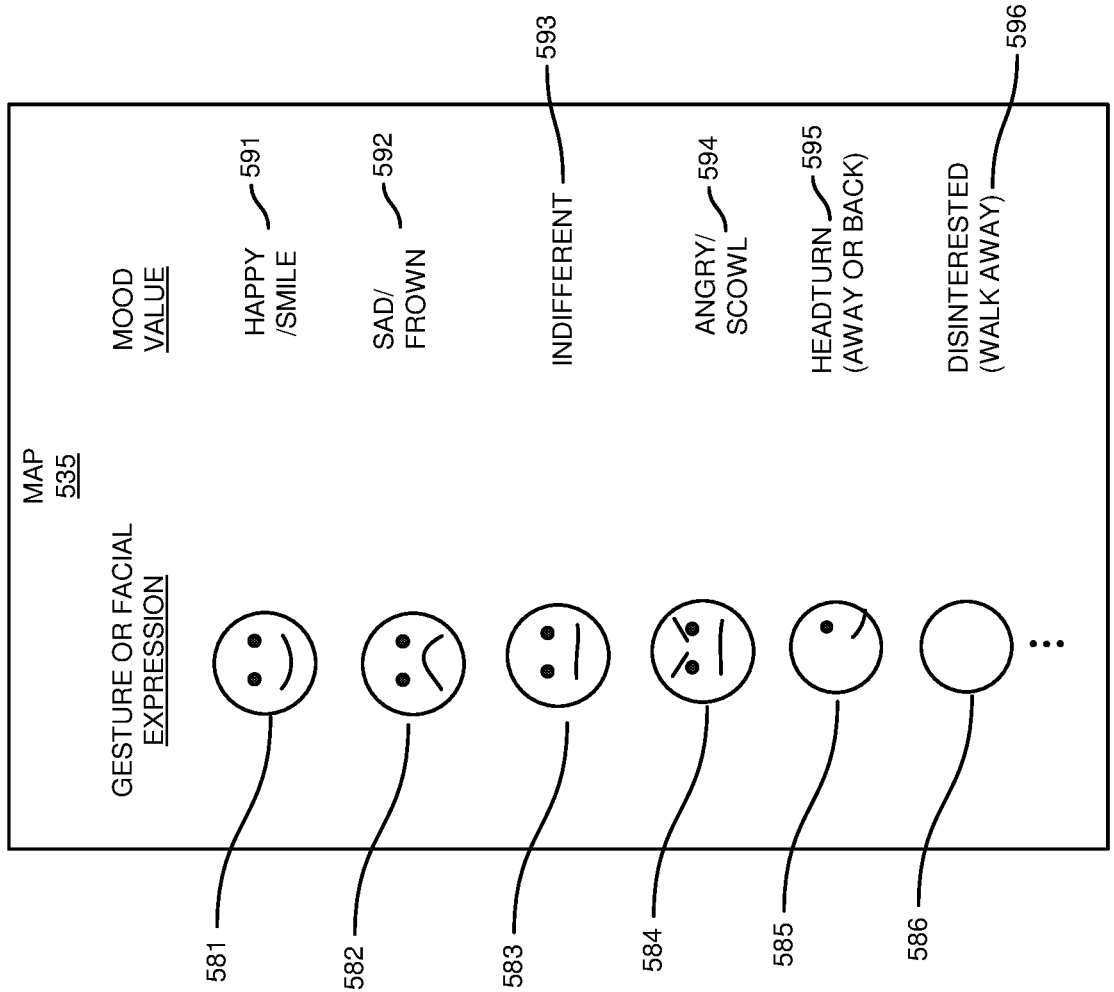
FIG. 5 is an example diagram illustrating a map that provides a mapping between gestures/facial expressions to a mood (expression) value according to embodiments herein.

FIG. 5 is an example diagram illustrating a map that provides a mapping between gestures/facial expressions to a mood value according to embodiments herein.

In this example embodiment, the map 535 illustrates physical image attributes associated with a monitored viewer and a corresponding assigned mood value.

For example, example expression 581 in map 535 maps to mood value 591 (happy/smile); expression 582 maps to value 592 (sad/frown); expression 583 maps to mood value 593 (indifferent); expression 584 maps to mood value 594 (angry/scowl); expression 585 maps to mood value 595 (headturn such as away from a display screen); expression 586 (such as person walking away from display screen) maps to mood value 596 (disinterested); etc.

As further discussed herein, the attributes of the example expressions are applied to images captured by the sensor device 312 to identify a respective expression of a viewer. In other words, the processing resource 425 uses baseline expressions 581, 582, 583, etc., to assign different images associated with the viewers 131, 132, etc., an appropriate mood value.

Figure 6:
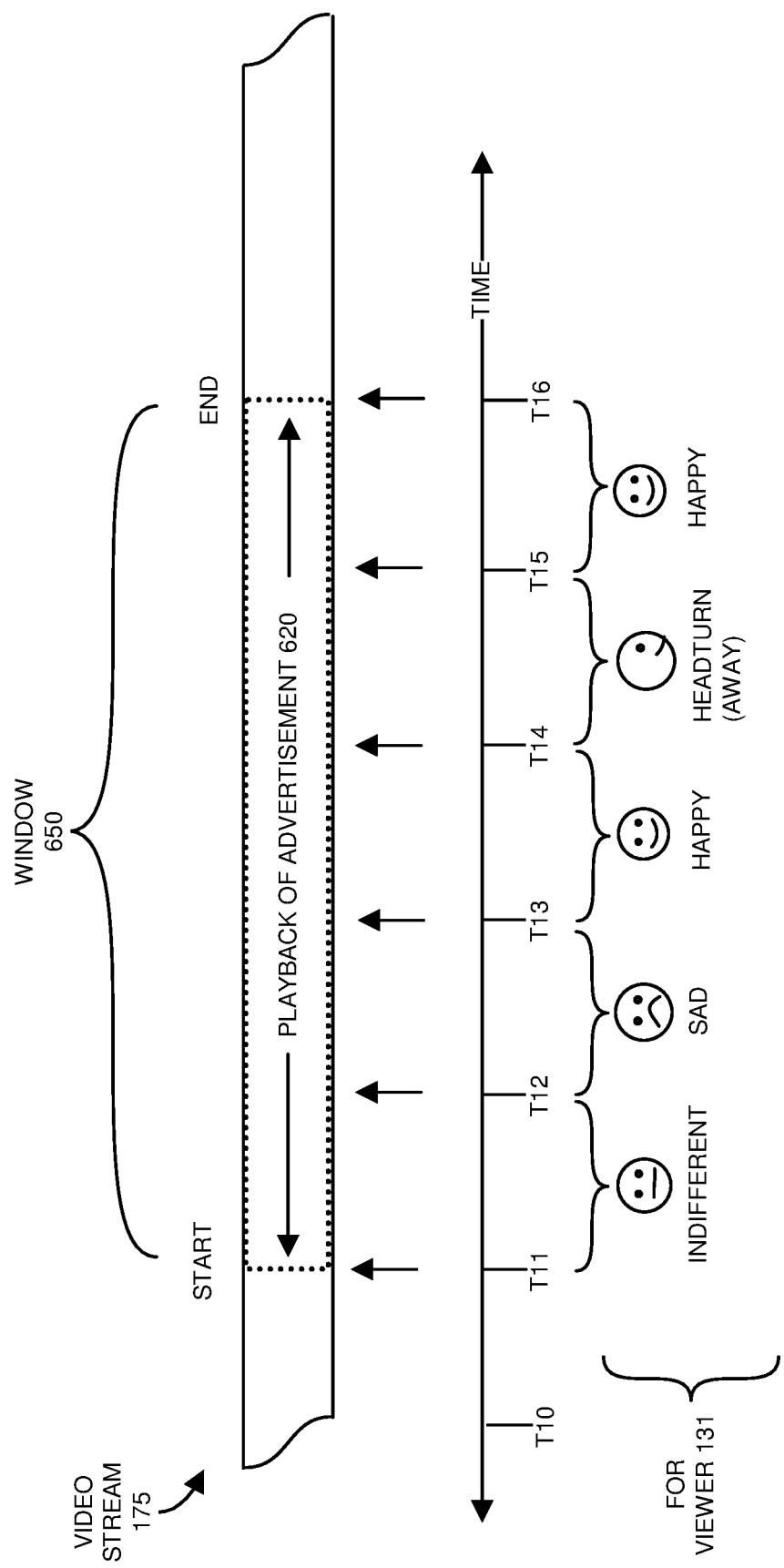
FIG. 6 is an example diagram illustrating playback of an advertisement and detected response according to embodiments herein.

FIG. 6 is an example diagram illustrating playback of an advertisement and detected viewer response according to embodiments herein. The following discussion refers to both FIG. 6 and FIG. 4.

In this example embodiment, the sensor device 312 monitors the viewer 131 in subscriber domain 477 viewing the images 420 on the display screen 130. During window 650 of receiving video stream 175, the display management resource 125 displays, on display screen 130, images 420 associated with the advertisement 620 to one or more viewers in the subscriber domain 477.

As a more specific example, between time T11 and T12, in a manner as previously discussed, the sensor device 312 produces scan data 422 (such as one or more samples of 3-D images) of viewer 131 (such as face and/or body images). In this example embodiment, the images of viewer 131 (captured via the scan data 422 between T11 and T12) produced by the sensor device 312 indicate that the viewer is indifferent about the images 420.

The sensor device 312 forwards the generated scan data 422 to the processing resource 425. Display management resource 125 also communicates image information 475 to the processing resource 425 to provide notification of information such as an identity and/or attributes of the advertisement 620 and corresponding timeframe of images 420 (and/or audio being played back by a playback device) such as the display screen 130 as viewed by the viewer 131 between time T11 and T12.

Between time T12 and T13, in a manner as previously discussed, the sensor device 312 produces scan data 422 (one or more samples of 3-D images) of viewer 131 (such as face and/or body images of the viewer 131 capturing a sad emotional state of the viewer 131). The sensor device 312 forwards the scan data 422 to the processing resource 425. Display management resource 125 also communicates image information 475 to the processing resource 425 to provide notification of information such as an identity of the advertisement 620 and corresponding timeframe (such as between T12 and T13) of images 420 and/or audio being played back by a playback device such as the display screen 130 and viewed by the viewer 131 between time T12 and T13.

Between time T13 and T14, in a manner as previously discussed, the sensor device 312 produces scan data 422 (one or more samples of 3-D images) of viewer 131 (such as face and/or body images of the viewer 131 capturing a happy emotional state of the viewer 131). The sensor device 312 forwards the scan data 422 to the processing resource 425. Display management resource 125 also communicates image information 475 to the processing resource 425 to provide notification of information such as an identity of the advertisement 620 and corresponding timeframe of images 420 and/or audio being played back by a playback device such as the display screen 130 and viewed by the viewer 131 between time T13 and T14.

Between time T14 and T15, in a manner as previously discussed, the sensor device 312 produces scan data 422 (one or more samples of 3-D images) of viewer 131 (such as face and/or body images of the viewer 131 capturing a gesture such as a temporary headturn of the viewer 131). The sensor device 312 forwards the scan data 422 to the processing resource 425. Display management resource 125 also communicates image information 475 to the processing resource 425 to provide notification of information such as an identity of the advertisement 620 and corresponding images 420 and/or audio being played back by a playback device such as the display screen 130 and viewed by the viewer 131 between time T14 and T15.

Between time T15 and T16, in a manner as previously discussed, the sensor device 312 produces scan data 422 (one or more samples of 3-D images) of viewer 131 (such as face and/or body images of the viewer 131 capturing a happy emotional state of the viewer 131). The sensor device 312 forwards the scan data 422 to the processing resource 425. Display management resource 125 also communicates image information 475 to the processing resource 425 to provide notification of information such as an identity of the advertisement 620 and corresponding images 420 and/or audio being played back by a playback device such as the display screen 130 and viewed by the viewer 131 between time T15 and T16.

As previously discussed, the surface textures (as indicated by the scan data 422) of an object such as viewer 131 in subscriber domain 477 as detected by the sensor device 312 defines a 3-D shape of the viewer. In a similar manner as previously discussed, the sensor device 312 can be configured to transmit optical energy (such as one or more pings) in multiple directions at the monitored location (such as one or more viewers). The sensor device 312 measures distances to the surface textures (such as a face of each viewer) based on the different portions of the optical energy (one or more pings) that reflects off the faces of each viewer in subscriber domain 477 watching the video images played back on the display screen 130 to produce respective 3-D scan data.

Note that, as an alternative to producing 3-D images via sensor device 312, the sensor device 312 can be configured to produce supplemental 2-D images of the viewers to capture corresponding viewer expressions. Thus, any suitable party can receive 3-D images illustrating texture (such as imagery or image data derived from distance-based surface texture measurements) as well as standard 2-dimensional images.

In accordance with yet further embodiments, the surveillance control panel 140 is configured to detect a trigger event and then providing notification of a respective surveillance condition (associated with the trigger event) in any suitable manner. For example, the sensor device 112 (providing distance-based object monitoring) can be installed in a garage environment such as front of a location where a vehicles typically parked.

In one embodiment, when the sensor device 112 and corresponding surveillance system detects that the vehicle is no longer present at a desired location for a predetermined amount of time in a garage parking space for a duration of time such as 5 minutes (such as indicating that the user has left the subscriber domain), the surveillance system can be automatically armed to monitor motion of one or more object in one or more zones of a respective subscriber domain.

Conversely, when the user parks her car back in the garage at the monitored location, the sensor device provides such imaging indicating its presence back to the surveillance control panel 140. The surveillance control panel 140, in such an instance, sets a disarm signal so that the owner of the household does not inadvertently set off any alarms that prompt a response by local authorities such as police.

Thus, when the car is stored in the garage, a disarm signal is sent out to disarm the respective surveillance control panel 140.

If desired, for additional security, the vehicle parked in the garage can be configured to send out a unique code to a receiver at the surveillance control panel that verifies the authenticity of the car. After authentication, the surveillance control panel 140 disarms the surveillance system to prevent inadvertent triggering of alarms caused by the driver of the car walking inside and/or around the respective home.

As further discussed herein, the scan data generated by the one or more sensor devices 112, 113, etc., can be used as a basis on which to identify (such as via facial recognition) an identity of one or more persons present in a subscriber domain. In one embodiment, the detection of legitimate persons that are entitled to be present in the subscriber domain, the surveillance control panel 140 performs automatic disarming of alarm notifications for such persons because they are authorized to be present.

In one embodiment, the one or more sensor devices 112, 113, etc., can be configured to identify gestures and/or facial expressions associated with the person's being monitored and use such information as a basis to determine if an alarm should be activated because such persons should not be in the subscriber domain.

For example, based on settings information, the surveillance control panel 140 can be configured to keep track of a secret gesture that must be made by the user in order to prevent any alarms from being triggered. The secret gesture can be anything such as holding up a hand with 2 fingers extended (which serves as a password), which means that the user is entitled to be present in the subscriber domain. Alternatively, if the user does not hold up a hand with 2 fingers extended, such as after being audibly prompted to provide a password by an audio device, the surveillance control panel 140 can be configured to generate a respective alarm trigger condition (to an appropriate one or more persons such as police, homeowner, etc.) indicating that there is a person present in the subscriber domain that does not know the appropriate password and probably should not be in the subscriber domain.

In accordance with further embodiments, the sensor device 112 (such as an IoT device), can be configured to include a RF (Radio Frequency) receiver. Each household members in the subscriber domain can be configured to carry a small RF ID (Identifier) tag (such as on their keychains). If the monitoring system (respective RFID detector) does not detect any RF tags within its operating range (such as inside the subscriber domain), and after a threshold of time such as ten minutes, the surveillance control panel 140 can be configured to automatically arms itself and locks the doors of the subscriber domain.

In accordance with further embodiments, the housing associated with sensor device 112 can be configured to include a module with a long-range Bluetooth™ receiver that would receive heartbeat signals from registered mobile devices such as cell phones. Detected presence (receipt of one or more heart beat signals from a known list of corresponding house members) or absence of users (failure to receive one or more heart beat signals from a known list of corresponding house members) can be used as a basis to disarm or arm the respective surveillance system (surveillance control panel 140).

In accordance with further embodiments, any wireless technology such as Wi-Fi™ can be used to identify user presence. For example, each registered mobile device user entitled to be present in the subscriber domain would have to send a signal to the module through the local LAN. After the user (or users) have exited the home, they would no longer be in range of the local Wi-Fi. In such an instance, because there are no signals received from the respective one or more members of the household, surveillance control panel 140 would be armed. Conversely, presence of such signals indicates to disarm the surveillance system.

If any of the registered users are near the door, they would be within range of RFID/Bluetooth/Wi-Fi for the system to disarm if already armed.

Referring again to FIG. 4, the processing resource 425 (such as an analyzer) receives the different sets of scan data 422 for each of the different timeframes from the sensor device 312. The processing resource 425 (analyzer) identifies an emotional or physical response of the first viewer viewing the displayed images (on the display screen) based on the images of the first viewer.

In accordance with further embodiments, the processing hardware 425 (or other suitable resource) produces feedback 175 including the identified response of the first viewer to the displayed images. Note that the identified response may be a single overall value describing the images of the viewer 131 or multiple response values, one for each of multiple time segments (or timeframes) of the presented advertisement 620.

For example, in this latter embodiment, the processing resource 425 analyzes scan data 422 associated with images of the viewer 131 between time T11 and T12. Via image analysis, such as comparison of a face of the viewer 131 (as captured by the scan data) to the different expressions in map 535, the processing resource 425 identifies that the image of the viewer 131 between time T11 and T12 is most similar to expression 583 in map 535. In such an instance, the processing resource 425 assigns the corresponding mood value 593 (such as indifference) to the time frame of advertisement 620 between T11 and T12.

The processing resource 425 analyzes scan data 422 associated with images of the viewer 131 between time T12 and T13. Via image analysis, such as comparison of a face of the viewer 131 (as captured by the scan data) to the different expressions in map 535, the processing resource 425 identifies that the image (expression) of the viewer 131 between time T12 and T13 is most similar to expression 582 in map 535. The processing resource 425 then assigns the corresponding mood value 592 (such as sad/frown) to the time frame of advertisement 620 between T12 and T13.

The processing resource 425 analyzes scan data 422 associated with images of the viewer 131 between time T13 and T14. Via image analysis, such as comparison of a face of the viewer 131 (as captured by the scan data) to the different expressions in map 535, the processing resource 425 identifies that the image of the viewer 131 between time T13 and T14 is most similar to expression 581 in map 535. The processing resource 425 then assigns the corresponding mood value 591 (such as happy/smile) to the time frame of advertisement 620 between T13 and T14.

The processing resource 425 analyzes scan data 422 associated with images of the viewer 131 between time T14 and T15. Via image analysis, such as comparison of a face of the viewer 131 (as captured by the scan data) to the different expressions in map 535, the processing resource 425 identifies that the image of the viewer 131 between time T14 and T15 is most similar to expression 585 in map 535. The processing resource 425 then assigns the corresponding mood value 595 (such as head turn away) to the time frame of advertisement 620 between T14 and T15.

In this manner, the processing resource 425 identifies different expressions associated with the one or more viewers in the subscriber domain 477. In one embodiment, the processing resource 425 produces the feedback 475 to indicate the different detected expressions associated with one or more viewers for the different timeframes (such as timeframe T11 to T12, timeframe T12 to T13, and so on).

In accordance with further embodiments, note that the processing resource 425 can be configured to use one or more timeframes of the advertisement 620 as a reference with respect to other portions of the advertisement 620. For example, the processing resource 425 can be configured to use the first timeframe of scan data 422 between T11 and T12 to determine a viewer's response during other timeframes. For example, the processing resource 425 can be configured to use the first timeframe and corresponding images as a baseline of comparison to other timeframes.

As a more specific example, assume that the content in timeframe T11 to T12 in advertisement 620 normally would elicit an indifferent response from a viewer. In such an instance, the processing resource 425 can be configured to assign the timeframe T11 to T12 an indifferent response even if the viewer 131 happens to be slightly smiling. In other words, the processing resource 425 selects the mood value 593 to assign to the viewer 131 in the first timeframe between T11 and T12. To determine an expression in subsequent timeframes, the processing resource 425 compares the images of the monitored viewer in scan data between T12 and T13 to images of viewer 131 in timeframe T11 to T12 to determine a change in expression of the viewer 131. Based on the identified change in expression of the viewer between timeframe T12-T13 relative to timeframe T11-T12, the processing resource 425 assigns a corresponding expression to the timeframe T12-T13.

In accordance with further embodiments, as previously discussed, the remote station 485 (such as a content distribution management resource) receives feedback 475 indicating the response of a respective viewer 131 to the advertisement 620.

In one embodiment, the remote station 485 uses the feedback 475 to identify one or more other advertisements likely to be of interest to the viewer 131. For example, if the remote station 485 determines that the viewer 131 has a positive response to the advertisement 620 as indicated by the feedback 175, the remote station 485 identifies other similar types of advertisements that might be of interest to the viewer 131.

In one embodiment, in response to detecting that the viewer 131 is interested in advertisement 620, the remote station 485 generates a control signal 495 indicating subsequent one or more other advertisements (similar to advertisement 620 such as baby supplies) to insert in the video stream 175 for playback on the display screen 130 for viewing by the viewer 131.

Accordingly, certain embodiments herein include utilizing a response of a viewer 131 to a first advertisement 620 and subsequently selecting other advertisements for distribution to the viewer 131 for playback.

In one embodiment, the subsequent images (such as advertisements) selected for playback to the first viewer 131 is or includes pre-recorded video and/or audio material other than images of the viewer 131 (monitored object) in the subscriber domain 477.

Note that in addition to or as an alternative to detecting an emotional response (or expression) of the one or more viewers 131, 132, etc., viewing images on display screen 130, via scan data 422, the processing resource 425 can be configured to detect physical attributes (such as gender, age, etc.) of the first viewer 131 based on the images of the first viewer 131 as captured by the received scan data 422 produced by the sensor device 312. In such an instance, the processing resource 425 produces the feedback 475 to additionally indicate the physical attributes (such as gender, age, etc.) of each of the one or more viewers (such as viewer 131, viewer 132, etc.) being monitored at the location of interest (subscriber domain 477).

The physical attributes of the detected viewers can be used as a basis to select subsequent advertisements for delivery to the display management resource and playback on the display screen 130.

Additionally, or alternatively, in one embodiment, the remote station 485 represents a sponsor entity associated with the advertisement 620. The feedback 475 notifies the sponsor entity that the viewer 131 viewed the advertisement 620 and the reaction (such as detected gestural or facial expression) of the viewer 131 such as generally positive in this example. In one embodiment, the feedback 475 indicates the different reactions of the viewer to different portions of the advertisement 620. Such information is useful to the sponsor regarding what aspects of the advertisement 620 capture a viewer's interest versus those that cause the viewer to lose interest in the advertisement. Such information is useful to the advertisement sponsor (advertiser) when producing subsequent advertisements.

In one embodiment, the remote station 485 receives feedback of the same advertisement from multiple different subscriber domains. Based on a large population of feedback 475 from multiple subscriber domains, the advertisement sponsor is able to receive an accurate assessment of an advertisement.

In accordance with further embodiments, the surveillance system as described herein can be configured to accurately identify the number of viewers being monitored. In such an instance, in contrast to conventional techniques where it is only known which household tunes to which available one or more cable channels, when many subscriber domains are monitored and provide similar feedback, an advertisement sponsor is notified of a number of actual viewers that watch an advertisement.

In one embodiment, inclusion of the sensor device in the subscriber domain 477 entitles the respective subscriber in subscriber domain 477 to a discount on monthly subscription fees.

Additionally, or alternatively, if the surveillance system as described herein does not detect any viewer in front of a display screen, after a set period or amount of time, the playback system can be configured to display a timeout prompt on the display screen. The user would have an option of continuing playback of current tuned content. If no input is received to stop automatic termination of tuning for playback, the display management resource 125 (playback system) can be configured to discontinue tuning to and playing back the respective current channel of information receives from the content source 105. Because the corresponding video 175 is no longer played back on the display screen 130, the content provider (such as Cable Company) operating the content source 105 may be able to reduce an amount of licensing fees for such content because viewers are not present watching the video 175.

Thus, since the system (such as surveillance control panel 140 and corresponding sensor devices) can detect the presence of the viewer, the surveillance control panel 140 (or other suitable resource) can be used to notify the content provider of video 175 of such conditions; the display management resource would alter any pre-set behavior; for instance, it would not playback certain licensed content as this would incur unnecessary costs to the cable company paying fees for the content such as video 175. A prompt could also be provided such as "Are you still there?" after a timeout period of not detecting a red viewer of content played back on the display screen 130.

Figure 7:
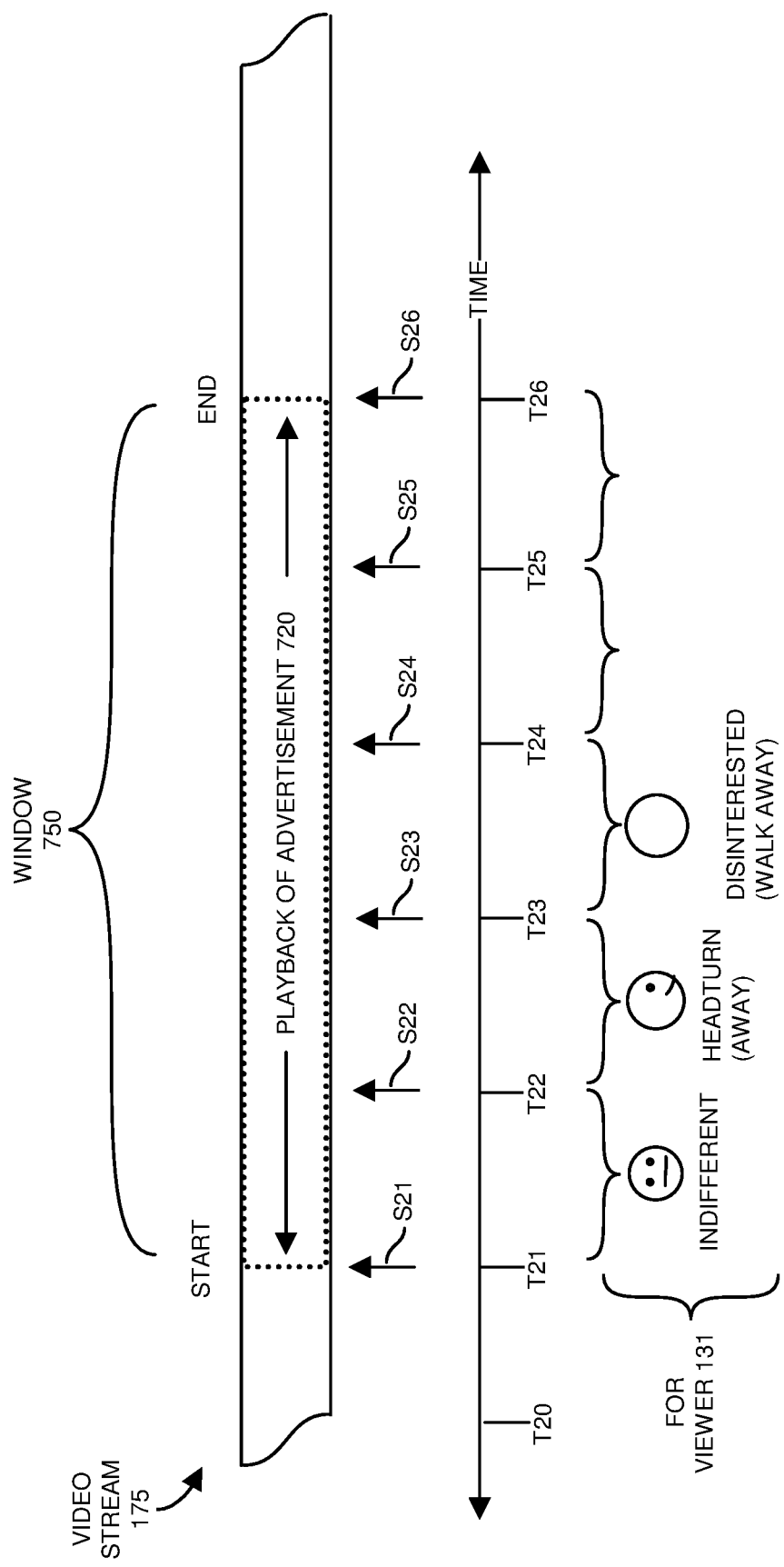
FIG. 7 is an example diagram illustrating playback of an advertisement and detected response according to embodiments herein.

FIG. 7 is an example diagram illustrating playback of an advertisement and detected viewer response according to embodiments herein.

In this embodiment, the sensor device 312 captures images of viewer 131 indicating that the viewer 131 is indifferent about the portion of advertisement 720 between timeframe T21 and T22; the sensor device 312 captures images of viewer 131 indicating that the viewer 131 is disinterested (via a head turn) with respect to the portion of advertisement 720 between timeframe T22 and T23; the sensor device 312 captures images of viewer 131 indicating that the viewer 131 is disinterested (via viewer walking away) with respect to the portion of advertisement 720 between timeframe T23 and T24;

the sensor device 312 captures images of viewer 131 indicating that the viewer 131 is no longer in the room (via detecting absence of the viewer) with respect to the portion of advertisement 720 for timeframe T24 and T25 and timeframe T25 to T26.

In a similar manner as previously discussed, the sensor device 312 communicates the corresponding captured images (in scan data 422) to the processing resource 425. The processing resource 425 analyzes the images in the different timeframes and notifies the remote station 485 of the different captured expressions of viewer 131.

In one embodiment, the remote station 485 notifies a sponsor of the different expressions captured by the scan data 422. Additionally, or alternatively, the remote station 485 can be configured to control subsequent playback of advertisement to the viewer 131 based on the detected expressions.

For example, in this instance, it is known that the viewer 131 is not interested in a product promoted by the advertisement 720. In such an instance, the remote station 485 can be configured to prevent playback of similar advertisements to the viewer 131 in the future so that the viewer 131 is not subjected to improper advertisements.

Figure 8:
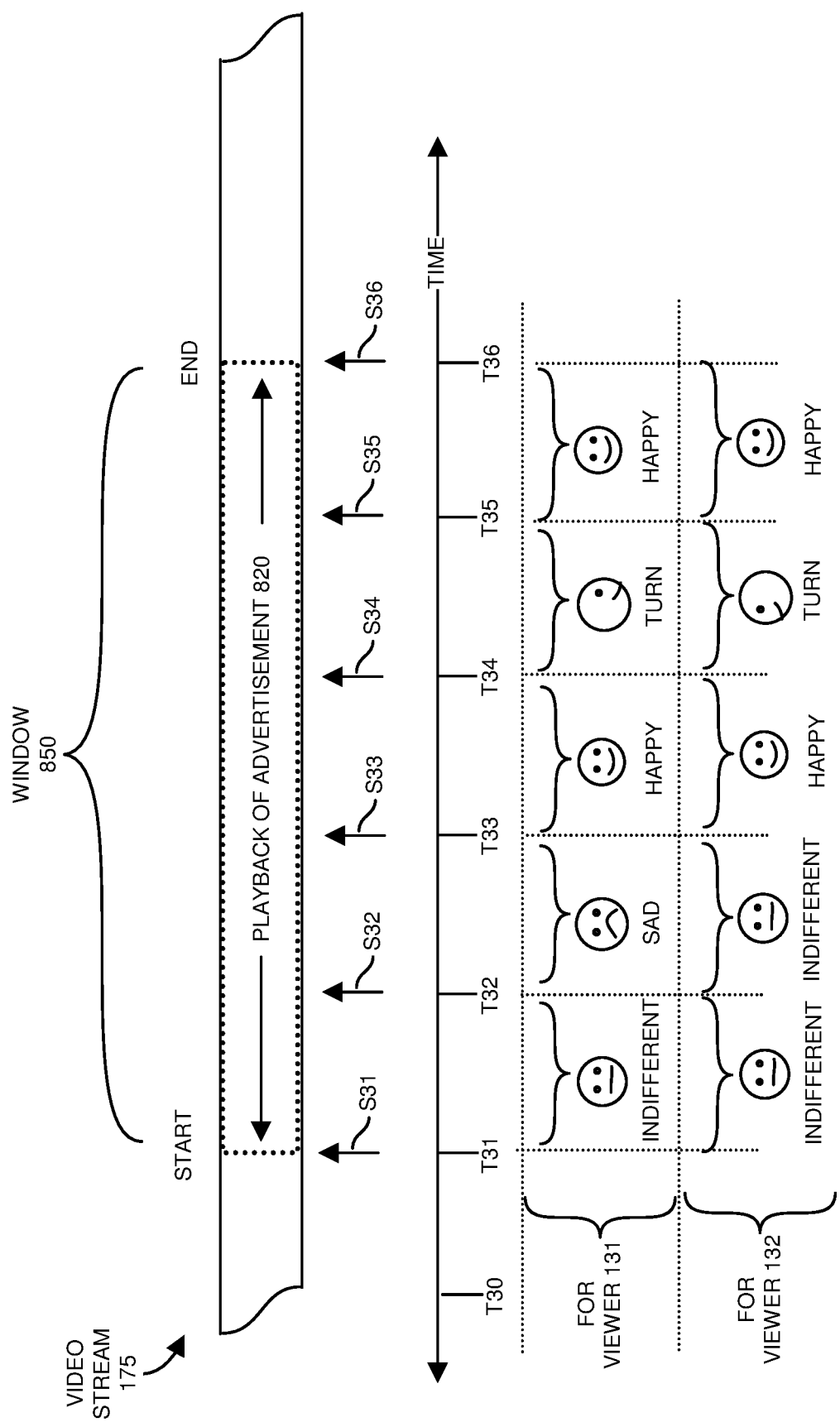
FIG. 8 is an example diagram illustrating playback of an advertisement and detected response according to embodiments herein.

FIG. 8 is an example diagram illustrating playback of an advertisement and detected viewer response according to embodiments herein.

As further discussed herein, note further that the scan data produced by the sensor device 312 can include images of multiple viewers (such as viewer 131 and viewer 132) viewing the images 420 associated with advertisement 820 displayed on the display screen 130.

For example, sensor device 312 monitors both viewer 131 and viewer 132 in the subscriber domain 477 during playback of the advertisement 820. In a similar manner as previously discussed, the sensor device 312 captures images of each viewer during the different timeframes.

Further in this example embodiment, the sensor device 312 produces corresponding scan data 422 to include a first array of image data capturing expressions of the first viewer 131 during the different timeframes (such as first timeframe between T31 and T32, second timeframe between T32 and T33, third timeframe between T33 and T34, and so on).

The sensor device 312 also produces corresponding scan data 422 to include a second array of image data capturing expressions of the second viewer 132 during the different timeframes (such as first timeframe between T31 and T32, second timeframe between T32 and T33, third timeframe between T33 and T34, and so on).

The sensor device 312 communicates the scan data 422 to the processing resource 425 for further processing in a manner as previously discussed.

In this example embodiment, referring again to FIG. 4, via scan data 422, the processing resource 425 (analyzer resource) receives images of a first viewer 131 and a second viewer 132 viewing the images on the display screen 130. The processing resource 425 is aware of the advertisement 820 and its attributes based on receipt of image information 482 from the display management resource 125.

Via analyzing the scan data 422 produced by the sensor device 312, the processing resource 425 identifies respective responses of the multiple viewers (such as first viewer 131 and second viewer 132) viewing the displayed images 420 based on the images of the first viewer 131 and the second viewer 132.

The processing resource 425 then produces one or more communications such as feedback 475 to include the identified response of the first viewer 131 and the second viewer 132 to the images 420 displayed on the display screen 130.

In accordance with further embodiments, via monitoring the scan data 422, the processing resource 425 identifies a response of the first viewer 131 and/or second viewer 132 based on analysis of one or more (verbal of non-verbal) communications (expressions such as gestural or facial) between the first viewer 131 and a second viewer 132 viewing the images 420 displayed on the display screen 130.

The identified and analyzed communications between the one or more viewers viewing the images 420 can include any responses such as each of the viewers smiling and laughing and then turning towards each other and then turning back to view the images on the display screen 130, providing an indication that the viewers find the images 420 to be very funny such as via detecting laughing; viewers physically turning their head and/or walking moving away from the display screen, indicating that the viewers are not interested in the images 420 played back on the display screen 130 at all; etc.

The interaction of and/or communications between the viewer 131 with the viewer 132 as indicated by the images (scan data 422) provides a respective advertisement sponsor further information about the effectiveness of the respective advertisement 820.

Figure 9:
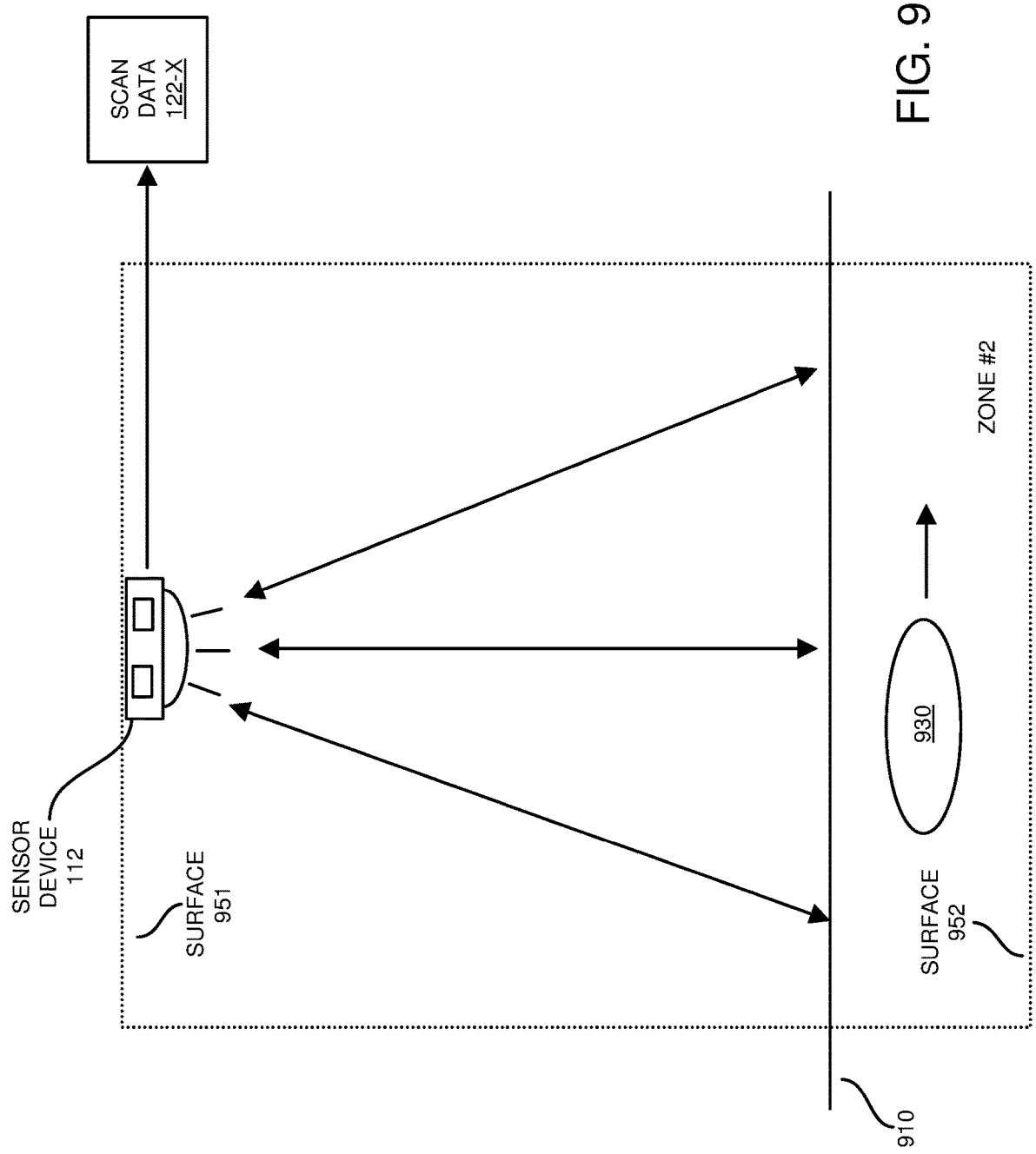
FIG. 9 is an example diagram illustrating distance-based sampling and object detection according to embodiments herein.

FIG. 9 is an example diagram illustrating distance-based object detection and monitoring according to embodiments herein.

In one embodiment, in a similar manner as previously discussed, any of one or more sensor devices (range or distance based sensors, 2-dimal sensors, liquid sensors, etc.) can be deployed in one or more zones of a subscriber domain to detect occurrence of trigger events such as unwanted intrusions, viewers responses to viewing content played back by a playback device, water leaks, etc.

In accordance with further embodiments, note that the scan data 122-X generated by a respective sensor device 112 can be filtered depending on distance of respective detected one or more objects to determine whether or not to trigger an alarm notification to an appropriate party such as a subscriber of the subscriber domain, domain monitor service, police, etc.

More specifically, FIG. 9 illustrates an example sensor device 112 (including any of one or more sensor apparatus as described herein) disposed on surface 951 (such as a ceiling, wall etc.) of a monitored zone #2. The scanned area of interest is above threshold value 910 (mark such as 40 inches above or aside) surface 952 (such as a floor or wall).

Thus, because the scan data 122-X is distance based, the sensor device 112 can be configured to ignore movement of object 930 beneath the threshold value 910. In other words, if a ping and corresponding reflection from the object is greater than a time threshold value indicating an object further from the sensor device 112 than the threshold value 910, the sensor device 112 ignores the movement of the respective object 930.

Additionally, or alternatively, if desired, the sensor device can 112 can be configured to generate the scan data 122-X to include all ping reflections and corresponding times. In such an instance, the scan data 122-X can be filtered to remove detection of any movement of objects that are further form the sensor device than the threshold value 910.

This would allow the surveillance system (sensor device 112) to be pet friendly; that is, dogs, cats and other household pets could roam around while the system is armed without triggering any notification to monitoring personnel such as police, homeowner, etc.

Figure 10:
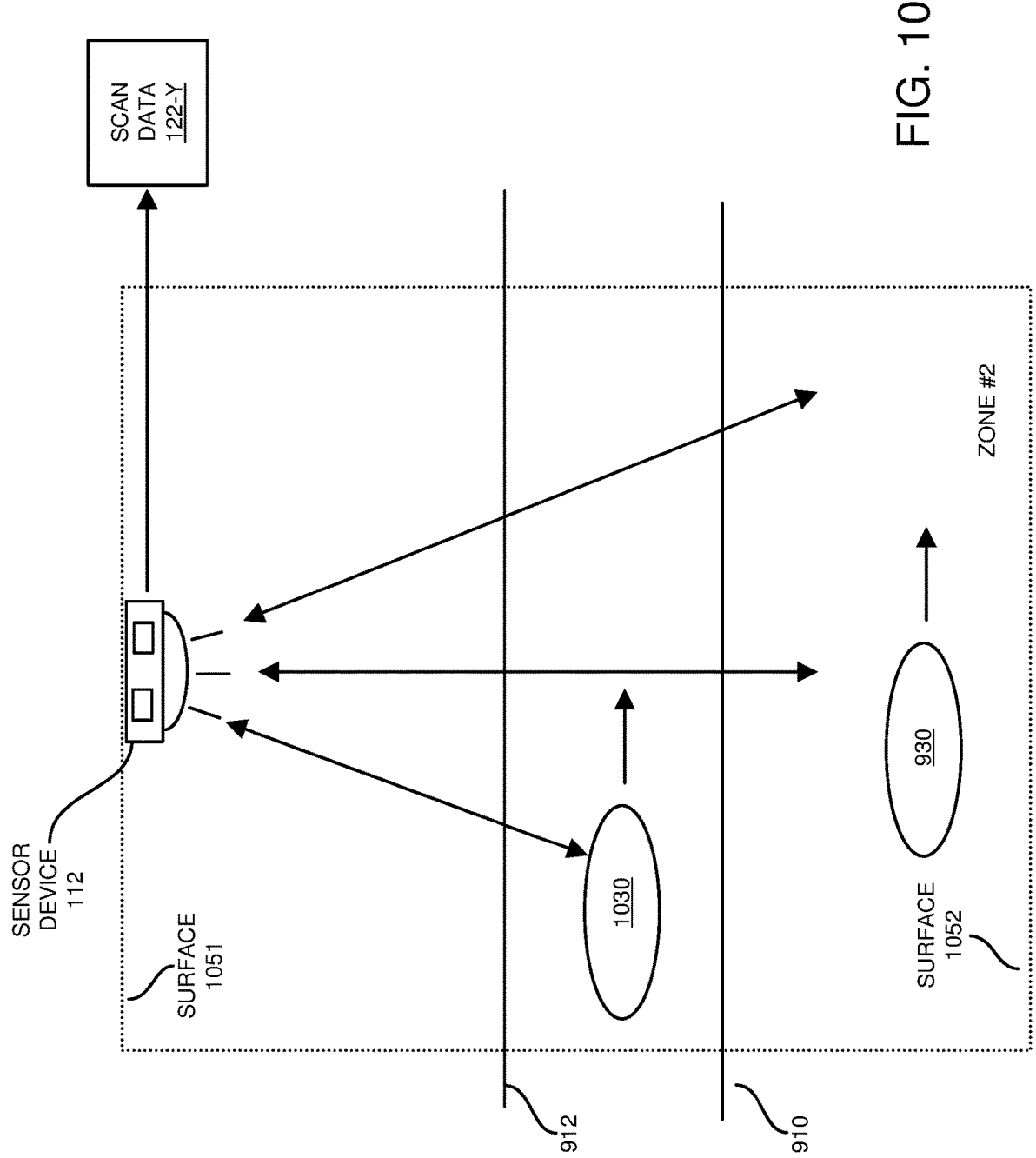
FIG. 10 is an example diagram illustrating distance-based sampling and object detection according to embodiments herein.

FIG. 10 is an example diagram illustrating monitoring of one or more regions of interest according to embodiments herein.

In this example embodiment, using distance-based monitoring (generation of pings and measurement of time for a reflection in different directions), the sensor device 112 monitors regions based on distance. For example, if the owner of the surveillance system is interested in monitoring movement in between the threshold value 912 and threshold value 910, the sensor device or corresponding analyzer looks for pings/responses corresponding to the objects in between threshold value 912 and 910.

More specifically, FIG. 9 illustrates an example sensor device 112 (including any of one or more sensor apparatus as described herein) disposed on surface 951 (such as a ceiling, wall etc.) of a monitored zone #2. The scanned area of interest is above threshold value 910 (such as 40 inches above) surface 952 (such as a floor) and further away than threshold value 912.

Thus, because the scan data 122-X is distance based, the sensor device 112 can be configured to ignore movement of object 930 beneath the threshold value 910 but trigger notification of an alarm based on object 1030 detected between threshold value 912 and threshold value 910. In other words, if a ping and corresponding reflection from the object indicates an object in the monitored band (between threshold value 912 and threshold value 910), the sensor device 112 or respective analyzer generates an alarm.

Figure 11:
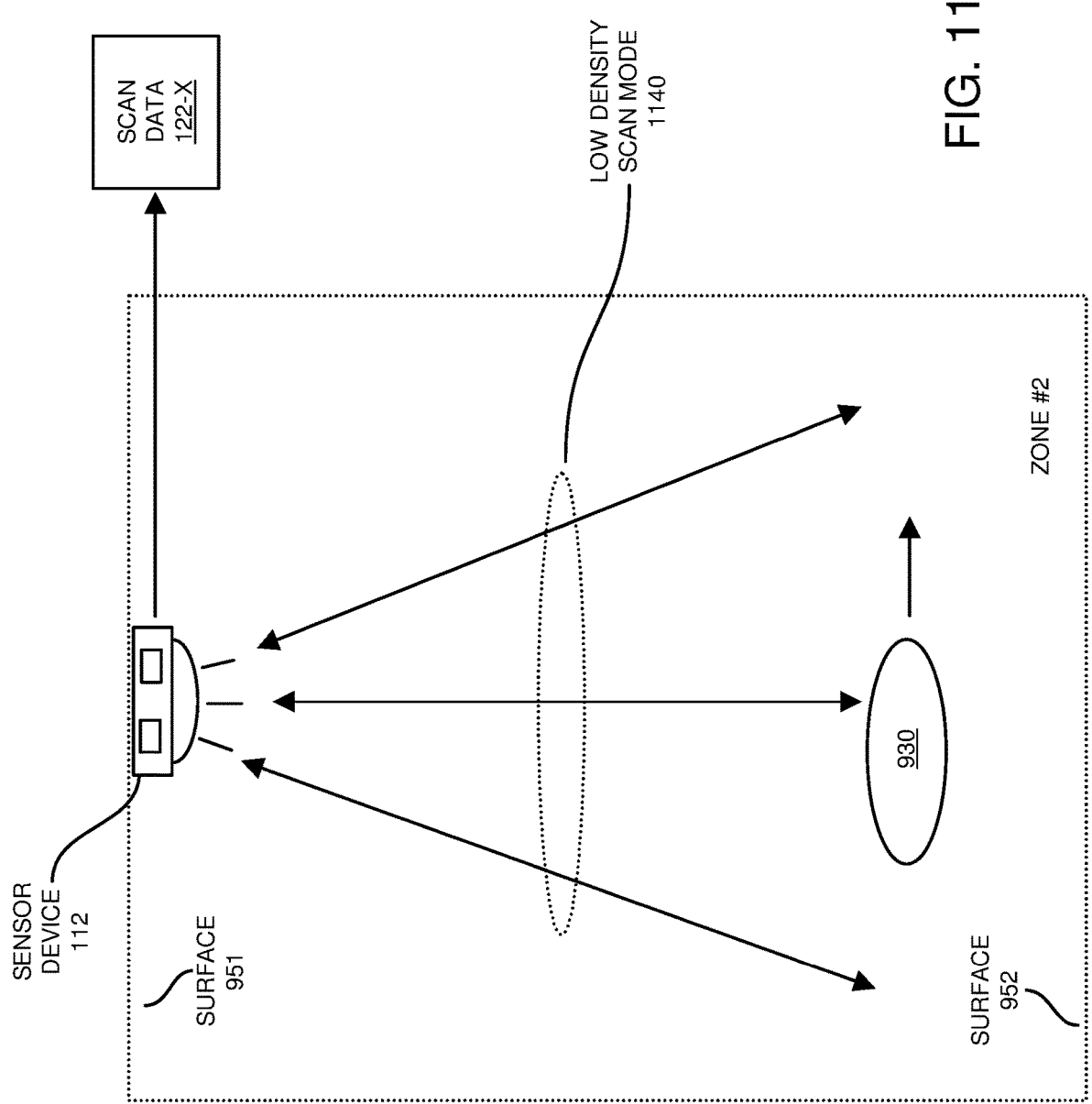
FIG. 11 is an example diagram illustrating low density distance-based sampling of a zone according to embodiments herein.

FIG. 11 is an example diagram illustrating low density distance-based sampling of objects according to embodiments herein.

In this embodiment, the sensor device 112 scans zone #2 in a low-density scan (sampling) mode 1140 (such as 6 degree angular difference between one sample and the next), such as to reduce energy consumption of the sensor device 112. Using distance-based scanning such as a time between a respective output optical energy pulse and a respective detected reflection, the sensor device 112 detects moving object 930.

In one embodiment, in response to detecting that the moving object should not be present in the zone #2, the sensor device 112 switches to operating in a manner as indicated in FIG. 12.

FIG. 12 is an example diagram illustrating low density distance-based sampling of objects according to embodiments herein.

In this example embodiment, in response to detecting the object 930, the sensor device 112 switches to scanning zone #2 in a high-density scan mode 1240 (such as 1 degree angular difference between one sample and the next), such as to get a better resolution surface contour of the object 930. If desired, the sensor device 112 operates in the high density scan mode 1240 only in a vicinity of the object 930 previously detected in the low density sample mode.

Alternatively, instead of only implementing high density scan sampling in a small region such as around the object 930, the sensor device 112 can be configured to apply high-density sampling in all of zone #2 in response to initially detecting the object 930 while operating in the low-density scan mode 1140.

Figure 13:
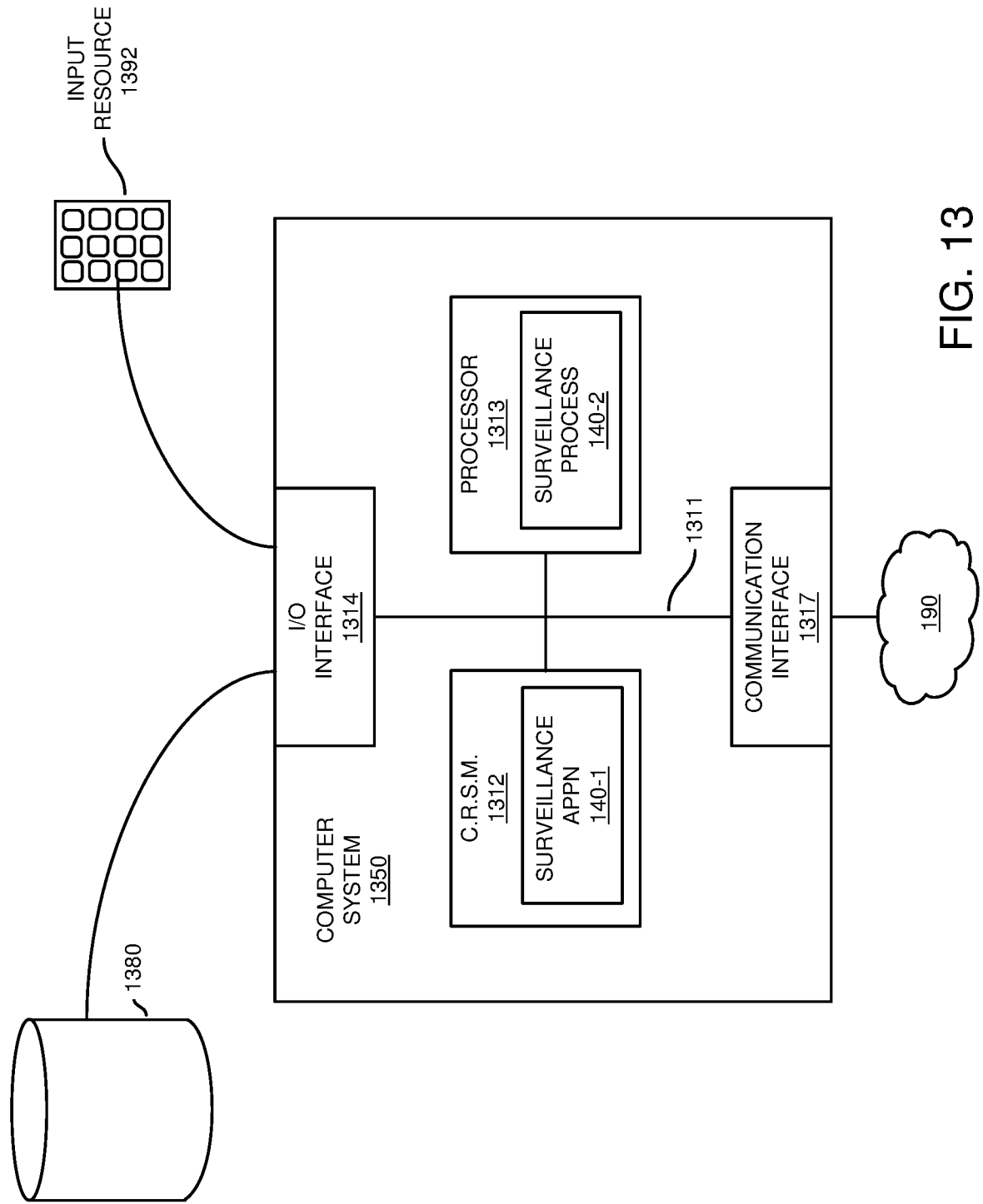
FIG. 13 is an example diagram illustrating example computer architecture operable to execute one or more operations according to embodiments herein.

FIG. 13 is an example block diagram of a computer system for implementing any of the operations as previously discussed according to embodiments herein.

Any of the resources (such as surveillance control panel 140, processing resource 425, display management resource 125, sensor device 112, sensor device 113, sensor device 312, remote station, etc.) as discussed herein can be configured to include computer processor hardware and/or corresponding executable instructions to carry out the different operations as discussed herein.

As shown, computer system 950 of the present example includes an interconnect 911 coupling computer readable storage media 912 such as a non-transitory type of media (which can be any suitable type of hardware storage medium in which digital information can be stored and retrieved), a processor 913 (computer processor hardware), I/O interface 914, and a communications interface 917.

I/O interface(s) 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with surveillance application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in in the surveillance application 140-1 stored on computer readable storage medium 912. Execution of the surveillance application 140-1 produces surveillance process 140-2 to carry out any of the operations and/or processes as discussed herein.

Those skilled in the art will understand that the computer system 950 can include other processes and/or software and hardware components, such as an operating system that controls allocation and use of hardware resources to execute surveillance application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowchart in FIGS. 14 and 15. Note that the steps in the flowcharts below can be executed in any suitable order.

Figure 14:
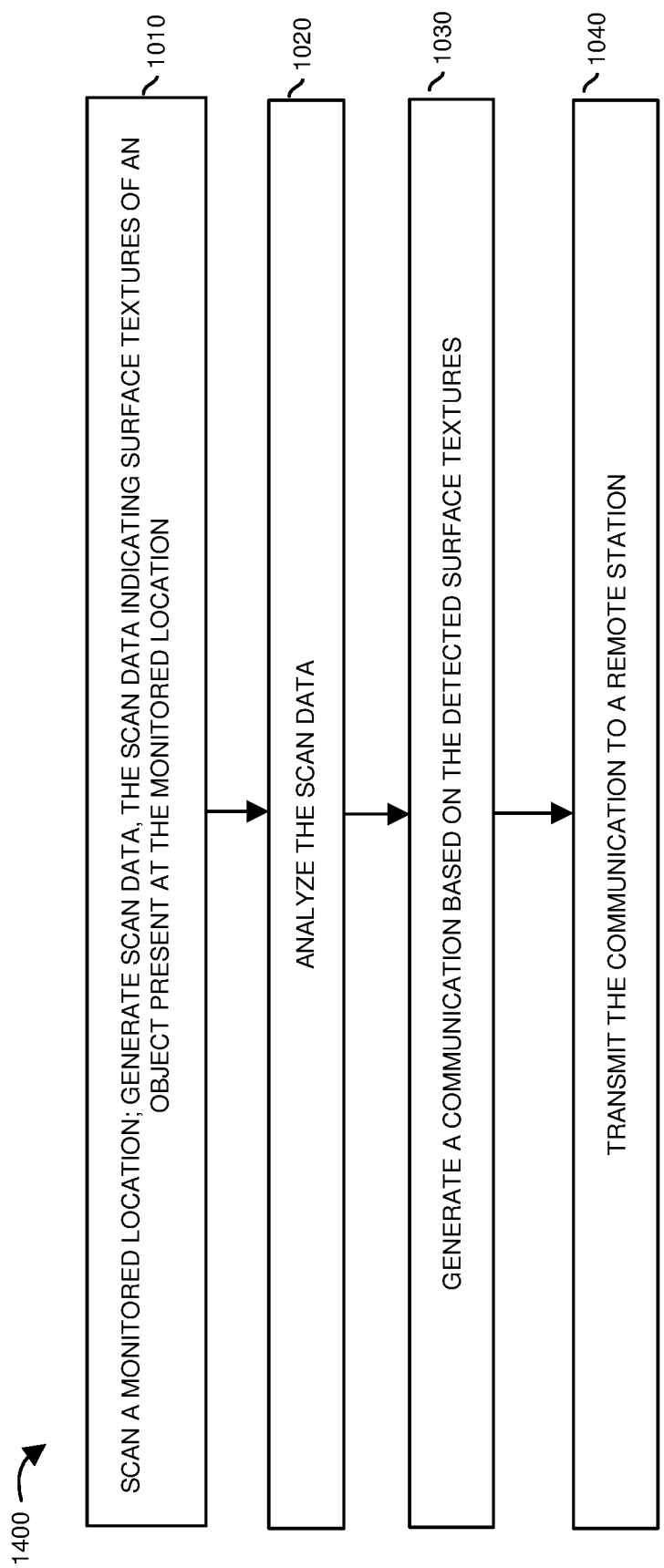
FIG. 14 is an example diagram illustrating a method according to embodiments herein.

FIG. 14 is a flowchart 1400 illustrating an example method according to embodiments herein. Note that there will be some overlap with respect to concepts as discussed above.

In processing operation 1410, the sensor device scans a monitored location of interest and generates scan data. The scan data indicates surface textures of one or more objects present at the monitored location of interest.

In processing operation 1420, the analyzer analyzes the scan data to identify occurrence of an event of interest (such as presence of an intruder, an expression of one or more viewers, etc.).

In processing operation 1430, the processing resource generates a communication based on the detected surface textures.

In processing operation 1040, the processing hardware transmits the communication to a remote station operative to provide further notification of one or more detected events of interest. For example, the generated communication can be provided to a user in a subscriber domain to indicate presence of a detected intruder; the communication can indicate an expression of an advertisement sponsor regarding a reaction of one or more viewers viewing the advertisement, etc.

Figure 15:
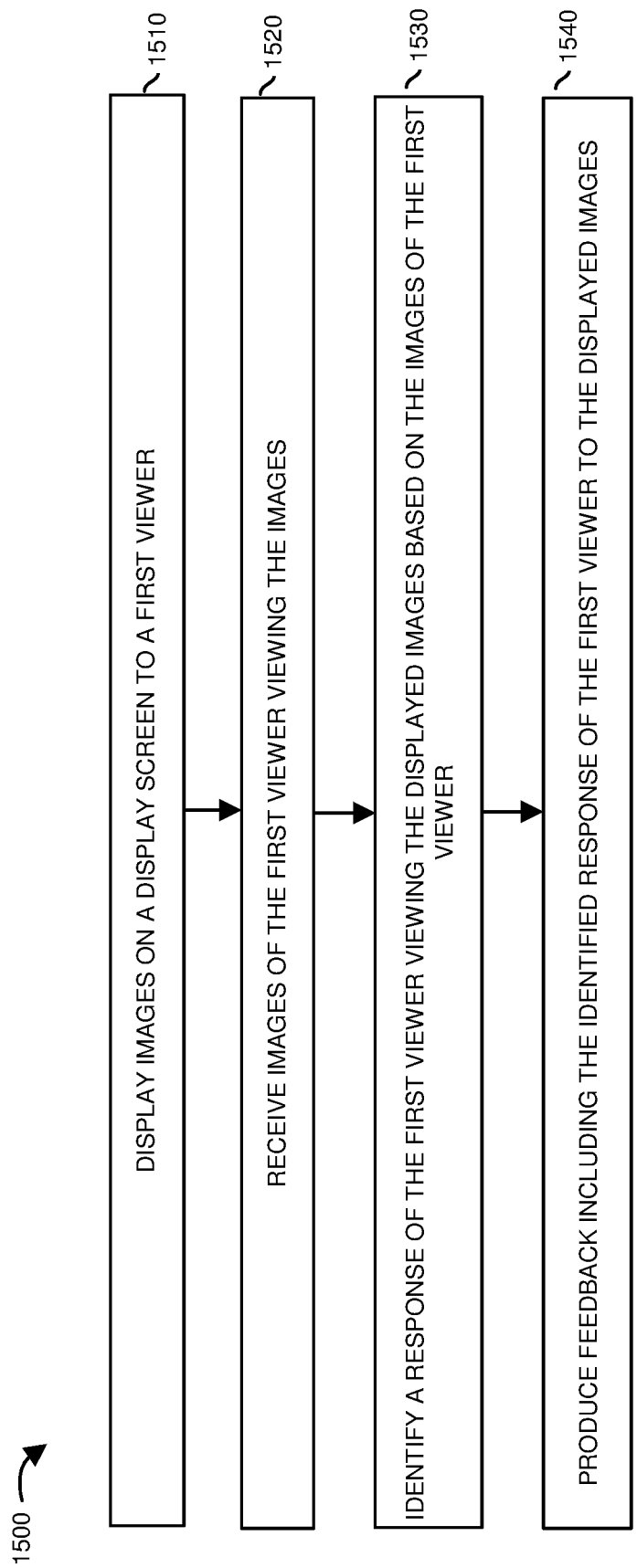
FIG. 15 is an example diagram illustrating a method according to embodiments herein.

FIG. 15 is a flowchart 1500 illustrating an example method according to embodiments herein. Note that there will be some overlap with respect to concepts as discussed above.

In processing operation 1510, the display screen displays 130 images to a first viewer 131.

In processing operation 1520, the sensor device 312 produces images of the first viewer 131 viewing the images 420 on the display screen 130.

In processing operation 1530, the processing resource 425 processes the scan data and identifies a response of the first viewer 131 viewing the displayed images based on the images of viewer 131 captured by the scan data 422.

In processing operation 1540, the processing resource produces feedback 475 (such as one or more communications) including the identified response of the first viewer 131 to the displayed images 420.

Note again that techniques herein are well suited to facilitate detection of events in a network environment and notification of same to one or more entities. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A surveillance system comprising:
a sensor device operative to scan a monitored location and generate scan data, the scan data indicating surface textures and motion of an object present at the monitored location;
analyzer hardware operative to analyze the scan data; and
controller hardware operative to: i) generate a communication based on the detected surface textures and motion of the object, and ii) transmit the communication to a remote station;
wherein the analyzer hardware is operative to filter the scan data based on a range of distance defined by a first distance threshold value and a second distance threshold value with respect to the sensor device;
wherein the analyzer hardware is operative to detect that the object resides between the first distance threshold value and the second distance threshold value based on timing of corresponding pings and reflections that fall within the range of distance; and
wherein the analyzer hardware is operative to generate an alarm in response to detecting the motion of the object occurring between the first distance threshold value and the second distance threshold value.

2. The surveillance system as in claim 1, wherein the scan data is distance-based scan data derived from the sensor device transmitting a respective energy pulse and monitoring reflected energy from the respective energy pulse, the system further comprising:
spectrometer hardware operative to detect presence of liquid on the surface textures of the object at the monitored location.

3. The surveillance system as in claim 1, wherein the analyzer hardware is operative to:
retrieve a first set of scan data generated by the sensor device, the first set of scan data representing baseline conditions of detected object surface regions in the monitored location; and
compare a second set of scan data produced by the sensor device to the first set of scan data to detect the motion of the object.

4. The surveillance system as in claim 1, wherein the surface textures define a 3-D shape of the object in the monitored location; and
wherein the sensor device is operative to transmit optical energy to the object at the monitored location and measure distances to the surface textures of the object based on a portion of the optical energy that reflects off the object back to the sensor device.

5. The surveillance system as in claim 1, wherein the sensor device is switched over to a high density sampling mode in response to detecting the object at a low density sampling mode.

6. The surveillance system as in claim 1, wherein the object is a first viewer; and
wherein the analyzer hardware is further operable to detect a facial expression associated with the user as indicated by the scan data based on the motion; and
wherein the controller hardware is further operable to: i) map the detected facial expression to a mood value representative of the detected facial expression, and ii) produce the communication to include the mood value.

7. The surveillance system as in claim 1, wherein the controller hardware is operative to:
control playback of subsequent images on a display screen at the monitored location depending on the detected surface textures and motion of the object present at the monitored location, the subsequent images being pre-recorded video other than images of the object.

8. A method comprising:
displaying images on a display screen to a first viewer;
receiving images of the first viewer viewing the images;
identifying a response of the first viewer viewing the displayed images based on the received images of the first viewer; and
producing feedback including the identified response of the first viewer to the displayed images;
the method further comprising:
designating a first timeframe of the images displayed on the display screen as a reference;
assigning a mood value to a detected response of the first viewer viewing the first timeframe oaf images; and generating a respective mood value of the first viewer for a second timeframe of the images based on a comparison of a detected response of the first viewer viewing the second timeframe of images to the detected response of the first viewer viewing the first timeframe of images; and wherein the respective mood value for the second timeframe is based on a detected change in expression of the first viewer from the second timeframe of the images relative to the first timeframe of the images.

9. The method as in claim 8, wherein analyzing the received images of the first viewer includes:
detecting a facial expression of the first viewer;
mapping the detected facial expression of the first viewer viewing the displayed images to a mood value representative of the detected facial expression; and
producing the feedback to include the mood value.

10. The method as in claim 9, wherein the images displayed on the display screen is an advertisement of a product to the first viewer, the method further comprising:
communicating the feedback to a sponsor promoting the product via the advertisement.

11. The method as in claim 8 further comprising:
controlling playback of subsequent images on the display screen depending on the response of the first viewer to the displayed images.

12. The method as in claim 8 further comprising:
receiving images of a second viewer viewing the images on the display screen;
identifying a response of the second viewer viewing the displayed images based on the images of the first viewer viewing the images on the display screen; and
producing the feedback to include the identified response of the second viewer to the images displayed on the display screen.

13. The method as in claim 8, wherein the identified response of the first viewer is based on a communication between the first viewer and a second viewer also viewing the images displayed on the display screen.

14. The method as in claim 8 further comprising:
detecting gender attributes of the first viewer based on the images of the first viewer; and
producing the feedback to indicate the gender attributes of the first viewer.

15. The method as in claim 8 further comprising:
detecting age attributes of the first viewer based on the images of the first viewer; and
producing the feedback to indicate the age attributes of the first viewer.

16. A surveillance system comprising:
a display screen operative to display images on a display screen;
sensor hardware operative to receive images of a first viewer viewing the images on the display screen;
processing hardware operative to:
identify a response of the first viewer viewing the displayed images on the display screen based on the images of the first viewer; and
produce feedback including the response of the first viewer to the displayed images;
designate a first timeframe of the images displayed on the display screen as a reference;
assign a mood value to a detected response of the first viewer viewing the first timeframe of images;
generate a respective mood value of the first viewer for a second timeframe of the images based on a comparison of a detected response of the first viewer viewing the second timeframe of images to the detected response of the first viewer viewing the first timeframe of images; and
wherein the respective mood value for the second timeframe is based on a detected change in expression of the first viewer from the second timeframe of the images relative to the first timeframe of the images.

17. The system as in claim 16, wherein the processing hardware is further operative to:
detect a facial expression of the first viewer;
map the detected facial expression of the first viewer to a mood value representative of the detected facial expression; and
produce the feedback to indicate the mood value.

18. The system as in claim 17, wherein the images displayed on the display screen is an advertisement of a product to the first viewer; and
wherein the processing hardware is further operative to:
communicate the feedback to a sponsor promoting the product via the advertisement.

19. The surveillance system as in claim 16, wherein the processing hardware is further operable to:
control playback of subsequent images on the display screen depending on the response of the first viewer to the displayed images.

20. The surveillance system as in claim 16, wherein the processing hardware is further operable to:
receive, from the sensor hardware, images of a second viewer viewing the images on the display screen;
identify a response of the second viewer viewing the displayed images based on the images of the first viewer; and
produce the feedback to include the identified response of the second viewer to the images displayed on the display screen.

21. The surveillance system as in claim 16, wherein the response is based on a communication between the first viewer and a second viewer viewing the images displayed on the display screen.

22. The surveillance system as in claim 16, wherein the processing hardware is further operable to:
detect gender attributes of the first viewer based on the images of the first viewer; and
produce the feedback to indicate the gender attributes of the first viewer.

23. The surveillance system as in claim 16, wherein the processing hardware is further operable to:
detect age attributes of the first viewer based on the images of the first viewer; and
produce the feedback to indicate the age attributes of the first viewer.

24. Computer-readable storage hardware having instructions stored thereon, the instructions, when carried out by computer processor hardware, cause the computer processor hardware to:
detect images displayed to a first viewer viewing images displayed on a display screen;
receive images of the first viewer viewing the images;
identify a response of the first viewer viewing the displayed images based on the received images of the first viewer; and
produce feedback indicating the response of the first viewer to the displayed images;
designate a first timeframe of the images displayed on the display screen as a reference;

assign a mood value to a detected response of the first viewer viewing the first timeframe of image;

generate a respective mood value of the first viewer for a second timeframe of the images based on a comparison of a detected response of the first viewer viewing the second timeframe of images to the detected response of the first viewer viewing the first timeframe of images; and wherein the respective mood value for the second timeframe is based on a detected chance in expression of the first viewer from the second timeframe of the images relative to the first timeframe of the images.

25. The method as in claim 8, wherein the images displayed on the display screen represent an advertisement for a product, the advertisement including multiple playback segments played back in each of multiple time segments; and wherein producing the feedback includes: generating a respective mood value of the first viewer for each of the multiple time segments.

26. The method as in claim 25, wherein the multiple time segments of the advertisement include a first time segment and a second time segment;

wherein the feedback includes: a first mood value assigned to the first time segment and a second mood value assigned to the second time segment;

wherein the first mood value indicates a first mood of the first viewer during the first time segment as determined from first images of the first viewer during the first time segment; and wherein the second mood value indicates a second mood of the first viewer during the second time segment as determined from second images of the first viewer during the second time segment.

27. The method as in claim 26, wherein the first time segment is defined by a first start time and a first stop time; and wherein the second time segment is defined by a second start time and a second stop time.

28. The method as in claim 8, wherein the mood value assigned to the detected response of the first viewer viewing the first timeframe of images is different than an actual expression of the first viewer viewing the first timeframe of images.

29. The surveillance system as in claim 1, wherein the analyzer hardware is operative to filter the scan data based on a distance of the object with respect to the sensor device.

30. A surveillance system comprising:

a sensor device operative to scan a monitored location and generate scan data, the scan data indicating surface textures and motion of an object present at the monitored location;

analyzer hardware operative to analyze the scan data; and controller hardware operative to: i) generate a communication based on the detected surface textures and motion of the object, and ii) transmit the communication to a remote station;

wherein the object is a first object; and wherein the analyzer hardware is operative to ignore motion of a second object in which timing of a ping and corresponding reflection from the second object is greater than a time threshold value.

31. The surveillance system as in claim 1, wherein the analyzer hardware is operative to identify objects of interest based on timing of pings and corresponding reflections from the objects.

* * * * *

UNITED STATES PATENT AND TRADEMARK OFFICE
CERTIFICATE OF CORRECTION

PATENT NO. : 10,860,864 B2  
APPLICATION NO. : 16/248993  
DATED : December 8, 2020  
INVENTOR(S) : Karim Ghessassi Page 1 of 1

It is certified that error appears in the above-identified patent and that said Letters Patent is hereby corrected as shown below:

In the Claims

Claim 8, Column 26, Line 66, delete "oaf" and insert --of--

Claim 24, Column 29, Line 2, delete "image" and insert --images--

Claim 24, Column 29, Line 10, delete "chance" and insert --change--

Signed and Sealed this  
Ninth Day of February, 2021

Drew Hirshfeld  
*Performing the Functions and Duties of the*  
*Under Secretary of Commerce for Intellectual Property and*  
*Director of the United States Patent and Trademark Office*